US012609095B2

(12) United States Patent
Minamitaka

(10) Patent No.: US 12,609,095 B2
(45) Date of Patent: Apr. 21, 2026

(54) TIME SIGNATURE DETERMINATION DEVICE, METHOD, AND RECORDING MEDIUM

(71) Applicant: CASIO COMPUTER CO., LTD., Tokyo (JP)

(72) Inventor: Junichi Minamitaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 882 days.

(21) Appl. No.: 17/951,019

(22) Filed: Sep. 22, 2022

(65) Prior Publication Data

US 2023/0116951 A1 Apr. 20, 2023

(30) Foreign Application Priority Data

Sep. 24, 2021 (JP) ................................ 2021-155215

(51) Int. Cl.
*G10H 1/00* (2006.01)

(52) U.S. Cl.
CPC ..... *G10H 1/0008* (2013.01); *G10H 2210/076* (2013.01); *G10H 2250/135* (2013.01); *G10H 2250/235* (2013.01)

(58) Field of Classification Search
CPC ........... G10H 1/0008; G10H 2210/076; G10H 2250/135; G10H 2250/235; G10H 1/40
See application file for complete search history.

(56) References Cited

U.S. PATENT DOCUMENTS

2010/0186576 A1 7/2010 Kobayashi
2020/0357369 A1* 11/2020 Wu .......................... G10H 1/40

FOREIGN PATENT DOCUMENTS

EP 4270373 A1 * 11/2023 ........... G10H 1/0008
JP 2005-234494 A 9/2005
JP 2007-272118 A 10/2007
JP 2010-072595 A 4/2010
JP 2010-122629 A 6/2010
JP WO2009125489 A1 * 7/2011 ............... G10H 1/40
JP 2021156975 A * 10/2021
WO WO-2014001849 A1 * 1/2014 ............... G10H 1/40

* cited by examiner

*Primary Examiner* — Jeffrey Donels
(74) *Attorney, Agent, or Firm* — CHEN YOSHIMURA LLP

(57) ABSTRACT

A device to determine a number of beats per bar from a music data includes at least one processor configured to calculate a weighted average beat level waveform from a first beat level waveform obtained for a first frequency band and a second beat level waveform obtained for a second frequency band; calculate autocorrelation on the weighted average beat level waveform by varying an amount of a shift interval for the autocorrelation; determine a plurality of the shift intervals at which correlation values of the autocorrelation are n highest, where n is a positive integer greater than or equal to 2; and determine the number of beats per bar based on the determined plurality of the shift intervals at which the correlation values of the autocorrelation are n highest.

13 Claims, 16 Drawing Sheets

TIME SIGNATURE DETERMINATION DEVICE, METHOD, AND RECORDING MEDIUM

BACKGROUND OF THE INVENTION

Technical Field

The present disclosure relates to a time signature or the number of beats per bar determination device, method and recording media therefor.

Background Art

Conventionally, a technique for analyzing the tempo of music sound data indicating a music sound is known (for example, Japanese Patent Application Laid-Open No. 2007-272118). If the tempo can be extracted from the music sound, for example, it is possible to play back audio data with a different tempo, or to play back at the same tempo by superimposing it on other MIDI (Musical Instrument Digital Interface) data.

SUMMARY OF THE INVENTION

Features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a method to be executed by at least one processor for determining a number of beats per bar from a music data provided to the at least one processor, the method comprising via the at least one processor: receiving the music data; deriving a first beat level waveform in accordance with a first power level waveform in a first frequency band from the music data and deriving a second beat level waveform in accordance with a second power level waveform in a second frequency band from the music data; calculating a weighted average beat level waveform from the first beat level waveform and the second beat level waveform; calculating autocorrelation on the weighted average beat level waveform by varying an amount of a shift interval for the autocorrelation; determining a plurality of the shift intervals at which correlation values of the autocorrelation are n highest, where n is a positive integer greater than or equal to 2; and determining the number of beats per bar based on the determined plurality of the shift intervals at which the correlation values of the autocorrelation are n highest.

In another aspect, the present disclosure provides a device for determining a number of beats per bar from a music data, comprising at least one processor, configured to perform the following: receiving the music data; deriving a first beat level waveform in accordance with a first power level waveform in a first frequency band from the music data and deriving a second beat level waveform in accordance with a second power level waveform in a second frequency band from the music data; calculating a weighted average beat level waveform from the first beat level waveform and the second beat level waveform; calculating autocorrelation on the weighted average beat level waveform by varying an amount of a shift interval for the autocorrelation; determining a plurality of the shift intervals at which correlation values of the autocorrelation are n highest, where n is a positive integer greater than or equal to 2; and determining the number of beats per bar based on the determined plurality of the shift intervals at which the correlation values of the autocorrelation are n highest.

In another aspect, the present disclosure provides a non-transitory computer readable storage medium storing a program executable by a computer, the program causing the computer to perform the following: receiving the music data; deriving a first beat level waveform in accordance with a first power level waveform in a first frequency band from the music data and deriving a second beat level waveform in accordance with a second power level waveform in a second frequency band from the music data; calculating a weighted average beat level waveform from the first beat level waveform and the second beat level waveform; calculating autocorrelation on the weighted average beat level waveform by varying an amount of a shift interval for the autocorrelation; determining a plurality of the shift intervals at which correlation values of the autocorrelation are n highest, where n is a positive integer greater than or equal to 2; and determining the number of beats per bar based on the determined plurality of the shift intervals at which the correlation values of the autocorrelation are n highest.

It is to be understood that both the foregoing general description and the following detailed description are exemplary and explanatory, and are intended to provide further explanation of the invention as claimed.

DETAILED DESCRIPTION OF EMBODIMENTS

Figure 1:
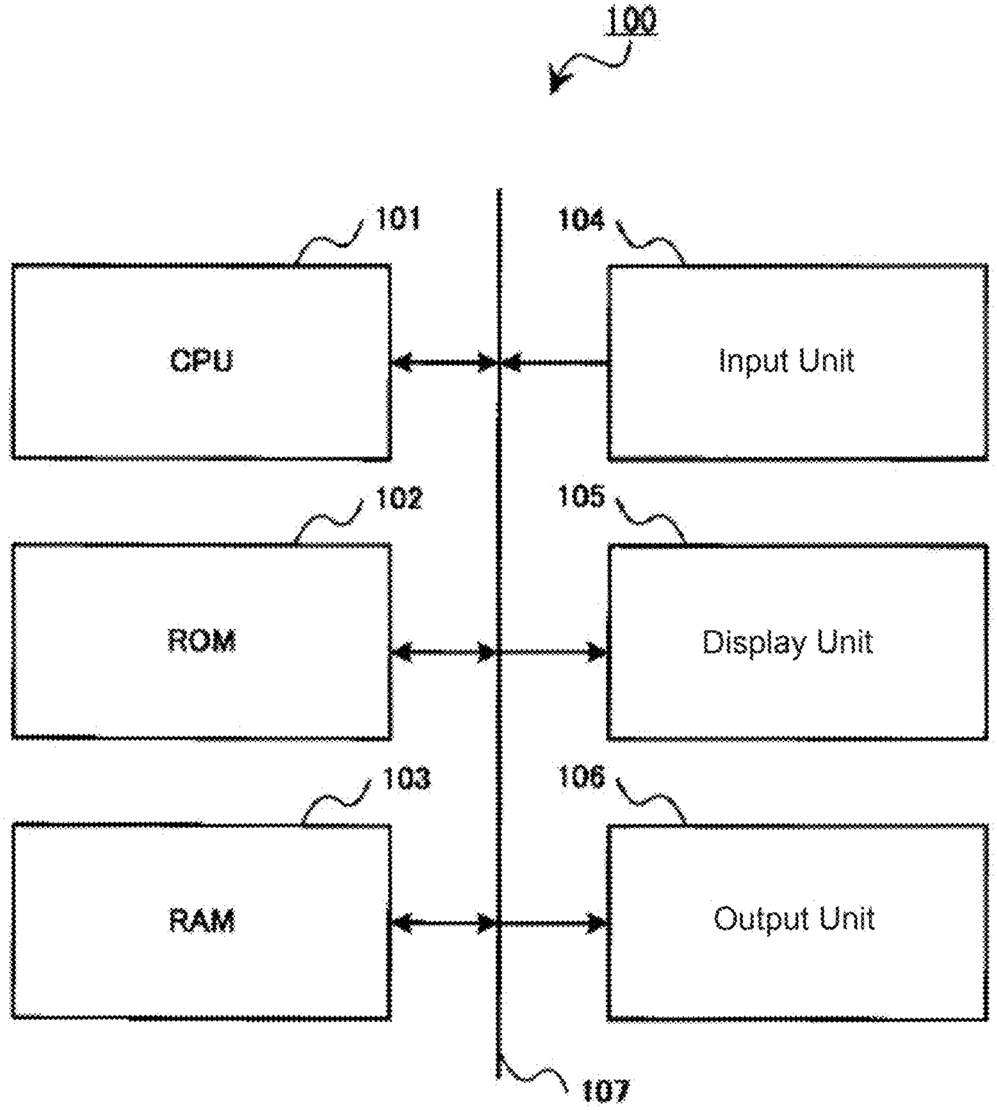
FIG. 1 is a block diagram of an embodiment of a time signature determination device.

FIG. 1 is a block diagram of a time signature (the number of beats per bar) determination device 100 according to an embodiment of the present invention. The time signature determination device 100 has a configuration in which a CPU 101, a ROM (read-only memory) 102, a RAM (random access memory) 103, an input unit 104, a display unit 105, and an output unit 106 are connected to each other by a system bus 107.

The CPU 101 controls the entire time signature determination device 100 and executes a beat analysis process.

ROM 102 stores a control program and a database.

The RAM 103 stores variables and the like when the control program is executed.

The input unit 104 is a part that inputs music audio data (music data), and receives data in an audio file format.

The display unit 105 displays the processing result.

The output unit 106 plays music audio.

Figure 2:
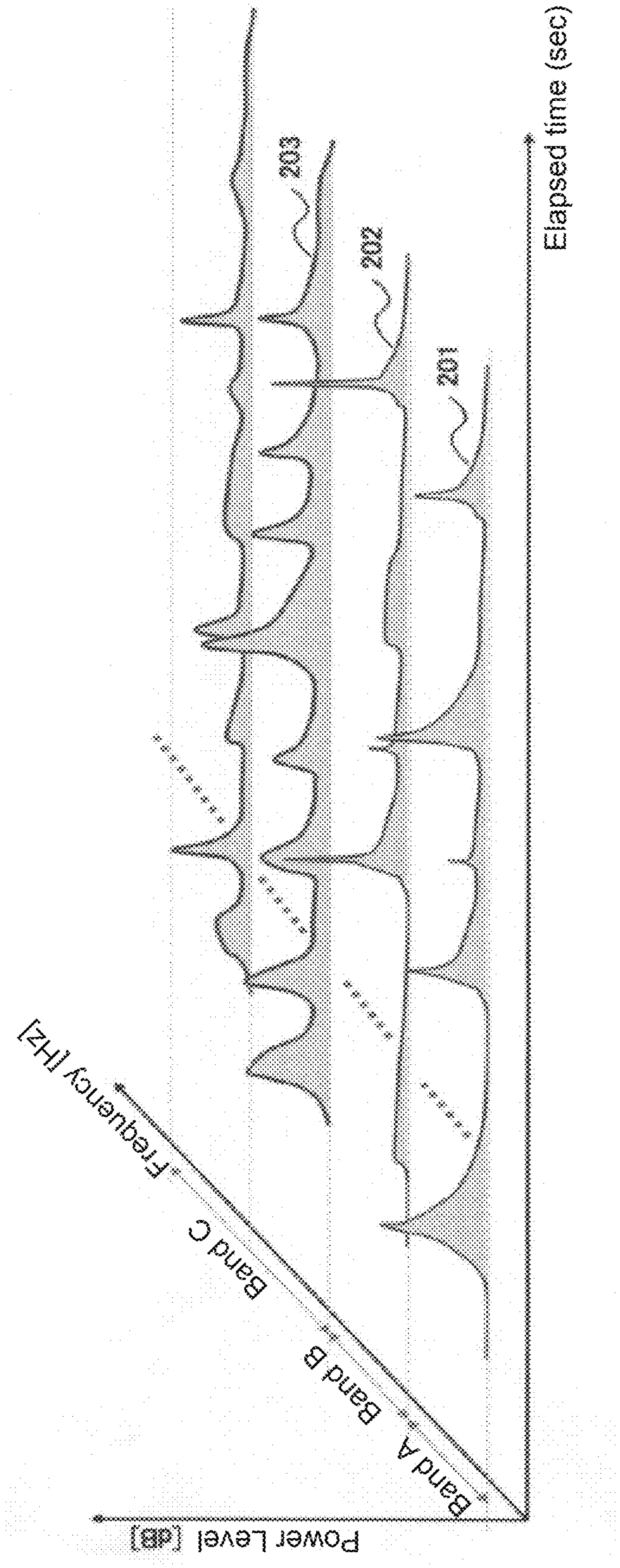
FIG. 2 is a schematic diagram showing power fluctuations for respective frequencies.

The operation outline of the embodiment of the time signature determination device 100 of FIG. 1 will be described below. FIG. 2 is a schematic diagram of power fluctuation for respective frequencies during the reproduction of music data. The diagonal axis in the depth direction in this three-dimensional plot indicates the frequency [Hz (hertz)], the horizontal axis indicates the elapsed time in seconds, and the vertical axis indicates the power level in dB.

Generally, the tempo of music is realized by the rhythm structure played by the musical instrument or sung by a singer. Music is composed of various instruments such as drums, bass, guitars, keyboard instruments and singing voices, and each part influences the tempo and rhythm structure. In general, it is often instruments such as drums, guitars, and keyboards that keep the tempo and rhythm, and a singing voice usually fluctuates and is more freely moved to some extent in terms of rhythm. In addition, the rhythm structure creates an order in music by having periodicity in each hierarchy, such as measures and beats.

It can be seen that the temporal change of the frequency spectrum illustrated in FIG. 2 shows the characteristic of periodicity for each frequency band. For example, focusing on band A, the power of the frequency component in that band fluctuates greatly in a periodic manner with the elapsed time. This power fluctuation 201 corresponds to the rhythm of the musical instrument performance. Here, the band A is a low frequency band. Therefore, it is considered that these four large power peaks are caused by, for example, a bass drum that emits a musical tone containing a large amount of low frequency components, and is rhythmically played in, for example, quadruple time.

Next, focusing on band B, which is an intermediate frequency band, power fluctuation 202 along the elapsed time can also be seen. However, in this case, the number of large peaks is two. Therefore, it is thought that these two large power peaks are due to, for example, a snare drum that emits a musical tone containing a large amount of frequency components in the middle band being rhythmically played at two sound timings of strong beats or weak beats in the quadruple time, for example.

Furthermore, focusing on band C, which is a high frequency band, power fluctuation 203 along the elapsed time can also be seen. However, in this case, the number of large peaks is eight. Therefore, it is thought that these eight large power peaks are rhythmically played, for example, by playing a chord with a guitar that emits a musical tone containing many frequency components in a high frequency band at the timings of eighth notes in the quadruple time, for example.

Based on the above considerations, in the embodiment described below (hereinafter referred to as "the present embodiment"), the power of the rising portion of the spectral power is defined as the beat level for each frequency band so that the characteristics of each musical instrument or song can be easily grasped. These beat levels are obtained from the frequency analysis result. They are obtained for each of the frequency bands in which they tend to appear as a feature of the rhythm structure.

Figure 3:
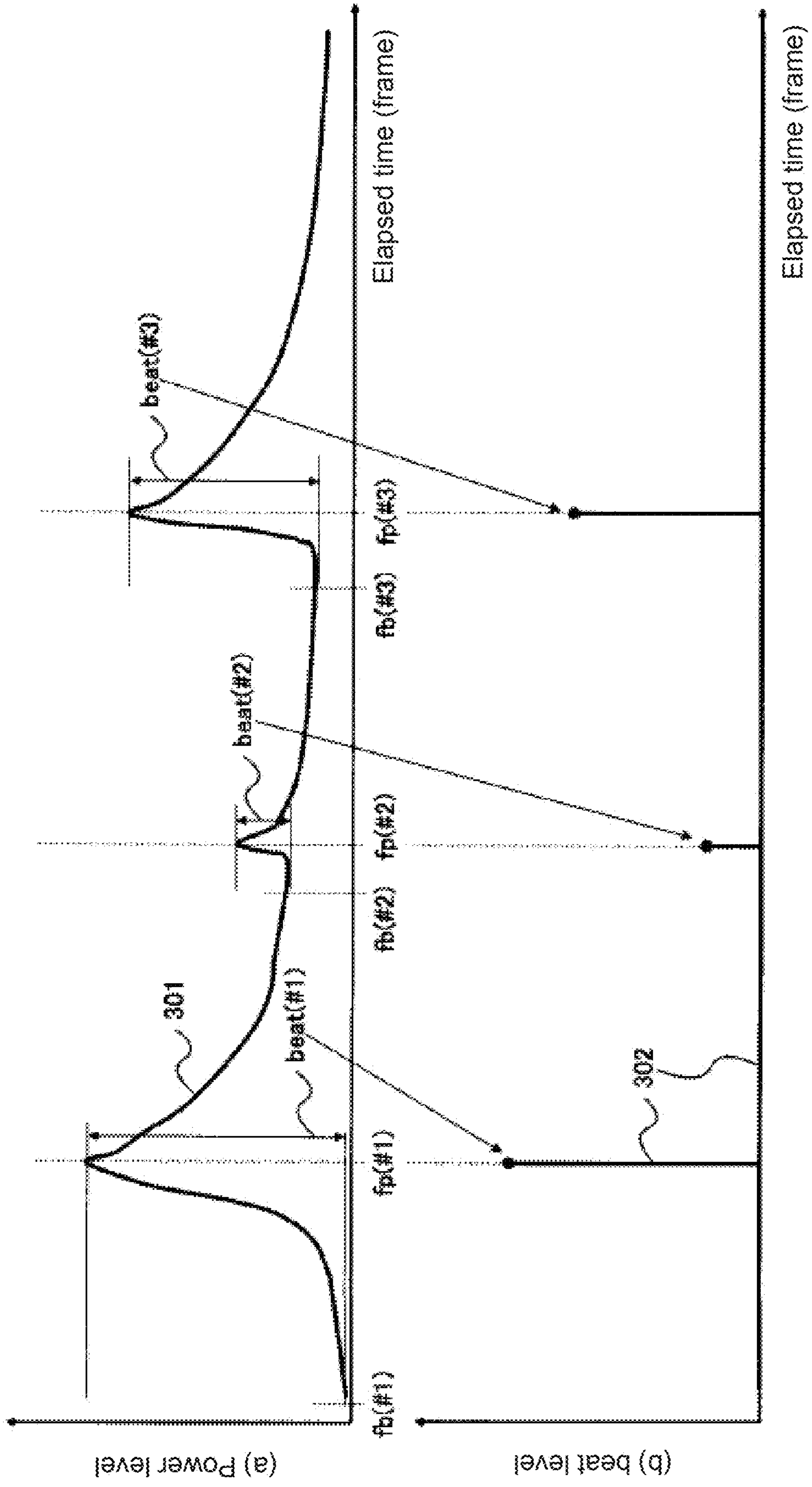
FIG. 3 is an explanatory diagrams for deriving a beat level fluctuation waveform from a power fluctuation waveform.

FIG. 3 is an explanatory diagram for deriving the beat level fluctuation waveform (beat level waveform) from the power fluctuation waveform (power level waveform). Focusing on the power fluctuation waveform 301 of a certain band calculated by, for example, short-time Fourier transform in frame units, the interval from the frame fb at which the power level fluctuation waveform changes from having negative slope to having positive slope to the frame fp at which the power level fluctuation waveform changes from having positive slope to having negative slope is determined to be the rising portion of the power fluctuation waveform 301. Then, the level difference from the power level at the frame fb to the power level at the frame fp is defined as the beat level at the frame fp. From the power fluctuation waveform (power level waveform) 301 of (a) of FIG. 3, three such large peaks #1, #2, and #3 can be extracted.

Therefore, the beat level fluctuation waveform (beat level waveform) 302 in (b) of FIG. 3 has a significant beat level value at each of the peak frames fp #1, #2, and #3, and has a value of 0 at other times.

Here, if only the beat level fluctuation waveform 302 corresponding to one band is used for the time signature detection, there is a possibility that accurate beats may not appear depending on the playing mode of the instrument corresponding to that band. Therefore, in the present embodiment, the beat level waveform calculated from the power level of every arbitrary frequency band as shown in FIG. 3 are first accumulated to produce the first beat level waveform corresponding to the entire frequency band of the music data. Then, with respect to each of the second frequency bands (which is any of the bands A, B, and C in FIG. 2, for example), the beat level waveform is calculated from the respective power level waveform as the second beat level waveform. As a result, the beat level fluctuation waveform 302 as shown in (b) of FIG. 3 above is obtained for each of the first frequency band and one or more of the second frequency bands. In the present embodiment, the weighted average beat level fluctuation waveform is calculated by weighted averaging the beat level fluctuation waveform 302 for each of the band with appropriate weights assigned to the respective bands. Then, the time signature—i.e., the number of beats per bar—is determined based on the weighted average beat level fluctuation waveform (weighted average beat level waveform).

In this way, the beat level fluctuation waveforms 302 calculated respectively for (1) the bass drum band, (2) the snare drum band, (3) the chord instrument band, and (4) the entire band are superimposed and weighted-averaged. This makes it possible to further emphasize the characteristics of periodic sounds that are due to beats and measures, and facilitates the extraction of the time signature. Non-periodic sounds such as melody included in the music are not emphasized by the superposition, and as a result, the sounds related to the beat are emphasized more. By superimposing the above (1) to (4), it becomes possible to determine the time signature for a wider variety of music.

Next, in the present embodiment, the following autocorrelation between the comparison source data and each comparison destination data is calculated based on the weighted average beat level fluctuation waveform calculated as described above. The comparison source data (i.e., data to be compared with the source) is data having a prescribed time period from each of the set elapsed times of the music data. Respective comparison destination data are data having the prescribed time interval from respective starting times that have been separated (shifted) from the comparison source data by time intervals corresponding to various settable tempos, respectively, for the music. Then, among the respective correlation values obtained by the autocorrelation calculation, a plurality of timings (peak positions) having high values (for example five highest) and the correlation values of each such timing are acquired. Then, the time signature is determined based on the acquired plurality of timings and the correlation value of each timing.

Figure 4:
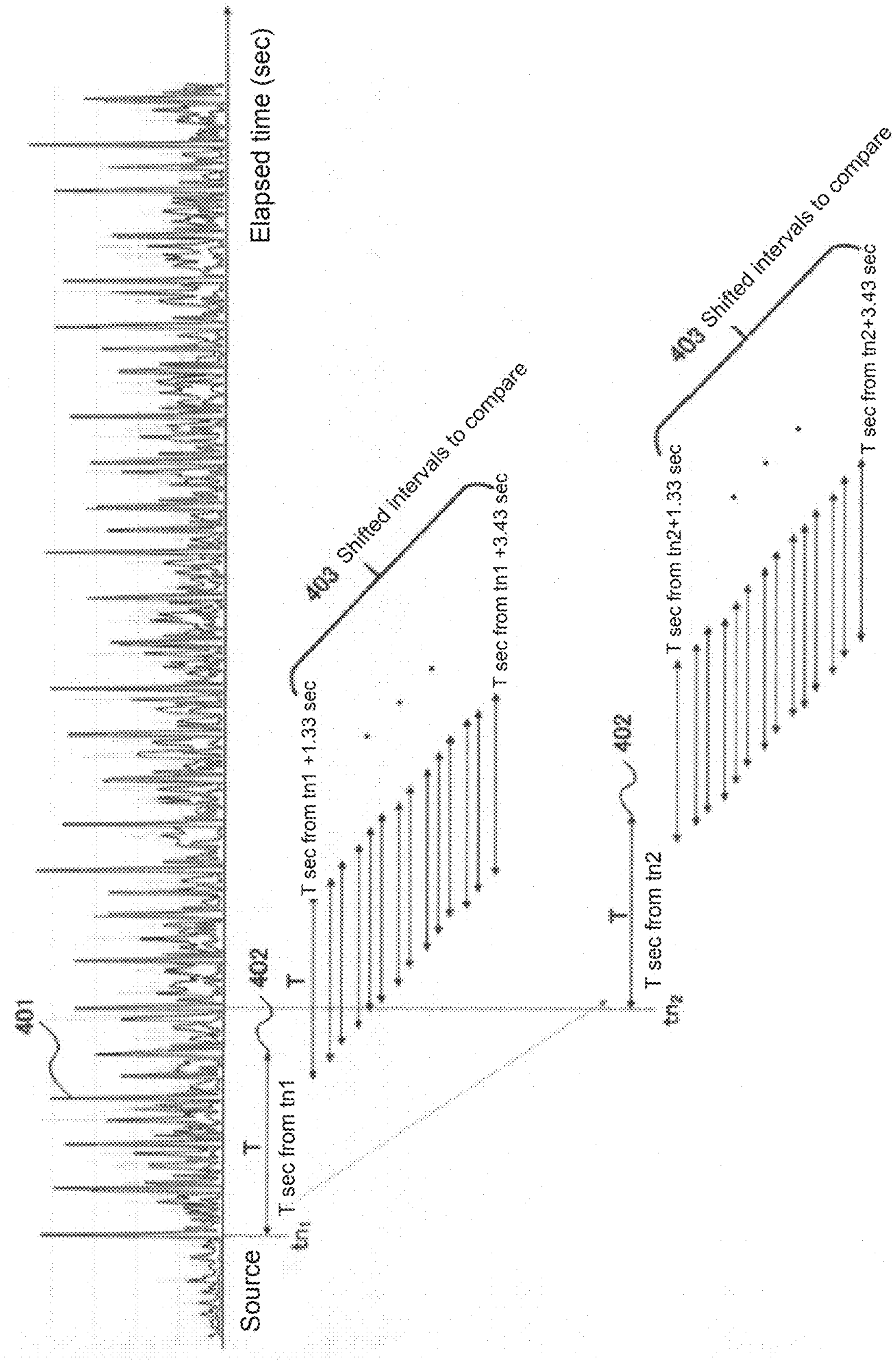
FIG. 4 is an explanatory diagram of autocorrelation calculation processing of a weighted average beat level fluctuation waveform.

FIG. 4 is an explanatory diagram of the autocorrelation calculation process of the weighted average beat level fluctuation waveform. Reference numeral 401 denotes a weighted average beat level fluctuation waveform described above. In this weighted average beat level fluctuation waveform 401, it can be seen that the regularity corresponding to the time signature is made conspicuous by the weighted average processing.

In the present embodiment, in the weighted average beat level fluctuation waveform 401, the comparison source data 402 are set by sequentially advancing a time interval having a prescribed length T by for example, 2 seconds from the elapsed time of 0 second, which is the beginning of the music (times tn1, tn2, etc., in FIG. 4). For example, 0 second to T seconds, 2 seconds to T+2 seconds, 4 seconds to T+4 seconds, and so on so forth. In addition, the comparison destination data 403 are created by shifting the comparison source data 402 by each of the respective time intervals corresponding to four beats of possible tempos that can be set for the music. For example, when the quarter notes in 4/4 (or each beat in the four-beat per bar) are at the tempos of 70 to 180 bpm (beats/minute), the shifting intervals are 3.43 seconds to 1.33 seconds. As a result, as shown in FIG. 4, intervals T seconds from tn1+1.33 (180 bpm) through T seconds from tn1+3.43 sec (70 bpm) are created for each of the source interval 402 as the comparison destination data 403 (i.e., "shifted intervals to compare"). Then, an autocorrelation is calculated between the comparison source data 402 and each of the comparison destination data (shifted intervals to compare) 403.

Figure 5:
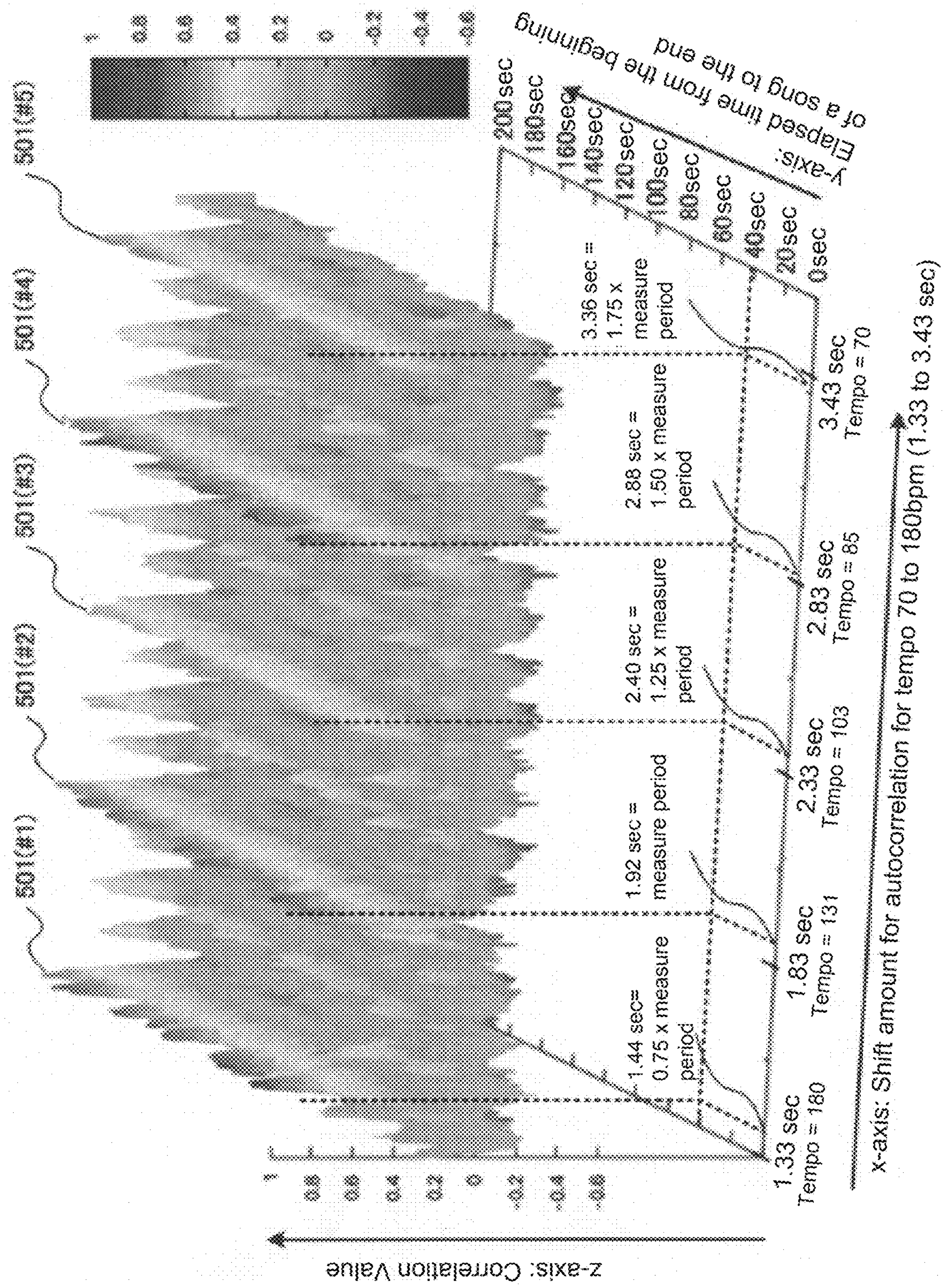
FIG. 5 is a diagram showing an example of an autocorrelation waveform (in the case of 4 beats) with respect to a weighted average beat level fluctuation waveform.

FIG. 5 is a diagram showing an example of an autocorrelation waveform (in the case of the four beats per measure/bar, such as the quadruple time) with respect to the weighted average beat level fluctuation waveform calculated as shown in FIG. 4.

In FIG. 5, the x-axis is the shift interval of the comparison destination with respect to the comparison source in the autocorrelation, and corresponds to the time interval per bar for the tempo of 70 bpm to 180 bpm (1.33 seconds to 3.43 seconds).

The y-axis is the elapsed time from the beginning to the end of the song.

The z-axis is the correlation value that is the result of the autocorrelation calculation.

In the autocorrelation waveform shown in FIG. 5, for each elapsed time in the y-axis direction, the comparison source data 402 (see FIG. 4) that lasts T seconds from the elapsed time is compared with each of the comparison destination data 403, each of which has been shifted by 1.33 seconds to 3.43 seconds from the comparison source data 402 (see FIG. 4), and the resulting correlation values are plotted in in the z-axis direction as a two-dimensional waveform in the x-axis direction. Further, the comparison source data 402 is shifted by each of the elapsed times in the y-axis direction so that a three-dimensional autocorrelation waveform is plotted as a whole.

The two-dimensional autocorrelation waveform spanned by the x-axis direction and the z-axis direction in FIG. 5, which is the foremost in the y-axis direction in the drawing, shows the autocorrelation waveform at, for example, 40 seconds from the beginning of the music.

It can be first discerned from a whole of the three-dimensional waveform exemplified in FIG. 5 that the peaks 501 of the correlation values of #1 to #5 appear near the time points at which the comparison destination data 403 are shifted from the comparison source data 402 by 1.44 seconds, 1.92 seconds, 2.40 seconds, 2.88 seconds, and 3.36 seconds, respectively. As described above, as the shift intervals of the comparison destination with respect to the comparison source in the calculation of autocorrelation, the time per bar of 1.33 seconds to 3.43 seconds for the tempo of 180 bpm to 70 bpm as possible applicable tempos is set. Therefore, it is considered that the peaks 501 of the correlation value appearing in the autocorrelation waveform exemplified in FIG. 5 show the beat components synchronized with the tempo and the beats generated by the music performance.

If a music with the four beats per bar is assumed, the peaks 501 of the correlation value should be lined up at the beat intervals corresponding to time intervals of the four beats in a single bar (i.e., the bar interval).

Further, since the tempo of the music is unknown, it is not yet determined which one of the correlation value peaks 501 of #1 to #5 appearing in an example in FIG. 5 corresponds to the actual bar length.

If the music is in the four beats per bar time and the shift interval for one of the peaks 501 corresponds to the bar length, the shift times/intervals corresponding to the other peaks 501 should be multiples of each beat timing of the four beats contained in one measure/bar. Specifically, assuming a music with the four beats per bar time, the shift time lengths corresponding to the peaks 501 of correlation values would have a fractional multiplication relationship with the bar length, such as 3/4 times, 4/4 times, and 5/4 times, 6/4 times, 7/4 times the bar length, and so on so forth. FIG. 5 shows the case where such a relationship is found. Therefore, in this case, it is determined that this music is played in the four beat per bar time.

Figure 6:
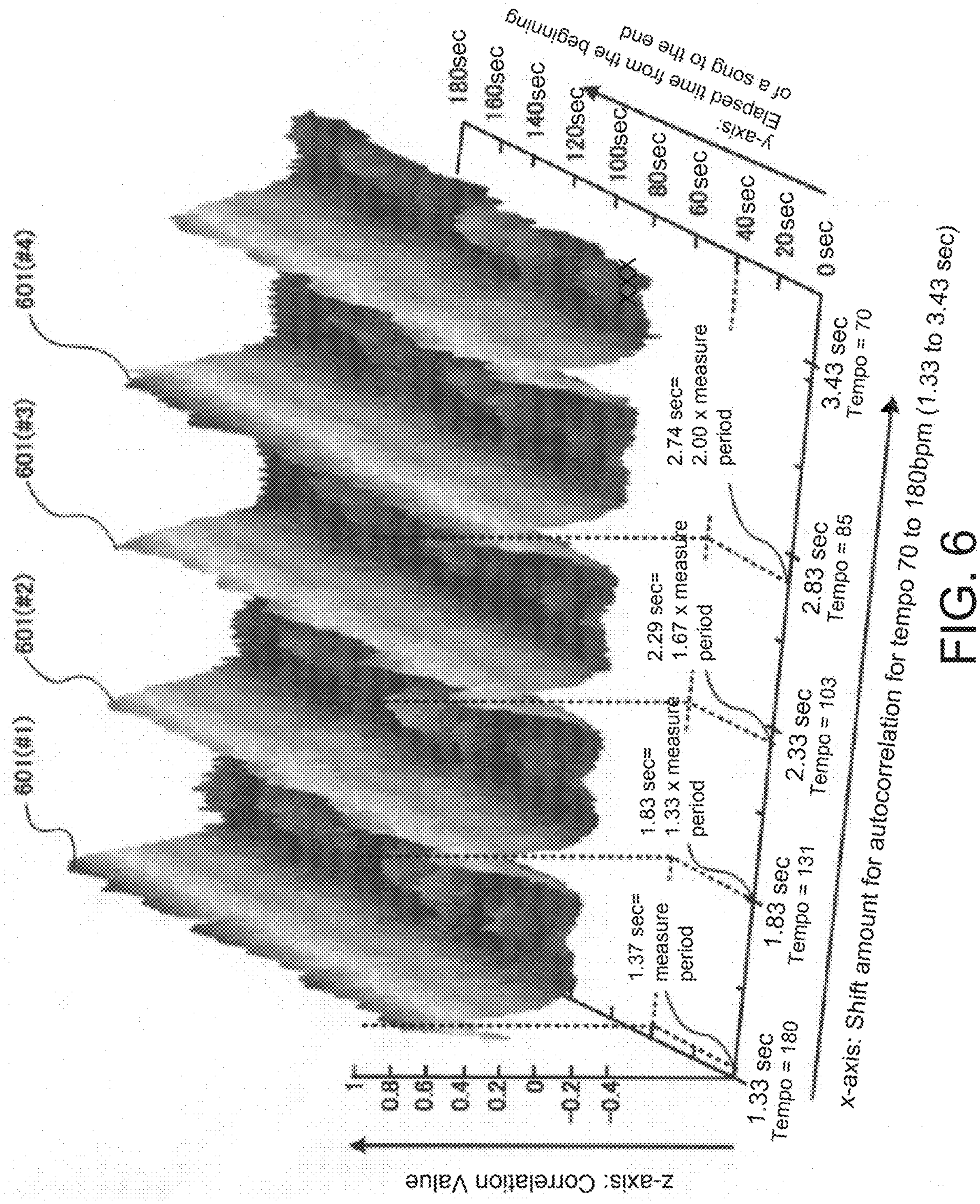
FIG. 6 is a diagram showing an example of an autocorrelation waveform (in the case of 3 beats) with respect to a weighted average beat level fluctuation waveform.

In this embodiment, if the above-mentioned relationship that would be satisfied in the case of the four beats per bar time is not found, then it is assumed that the music is in the three-beat per bar time. FIG. 6 is a diagram showing an example of an autocorrelation waveform with respect to the weighted average beat level fluctuation waveform calculated as shown in FIG. 4 when the music is played in the three-beat per bar time. In FIG. 6, the meanings of the x-axis, y-axis, and z-axis are the same as in FIG. 5, respectively.

The meaning of the three-dimensional shape of the autocorrelation waveform shown in FIG. 6 is the same as in the case of FIG. 5. From a whole of the three-dimensional waveform exemplified in FIG. 6, first, it can be discerned that the peaks 601 of the correlation value of #1 to #4 appear near at time points at which the comparison destination data 403 is shifted from the comparison source data 402 by 1.37 seconds, 1.83 seconds, 2.29 seconds, and 2.74 seconds, respectively.

If it is assumed that the shift time corresponding to one of the peaks 601 corresponds to the bar length, the shift times corresponding to the other peaks 601 would have a fractional multiplication relationship for each of three beats in the bar with respect to the bar length. Specifically, in the case of the three-beat per bar time, the shift time lengths corresponding to the peaks 601 would have a fractional multiplication relationship, such as 3/3 times, 4/3 times, 5/3 times, 6/3 times the bar length, and so on so forth.

In the present embodiment, if the above-mentioned relationship in the case of the three-part time is also not found, then, it is assumed that the music has five beats per bar. If the shift time corresponding to one of the peaks corresponds to the bar length, the shift times/intervals corresponding to the other peaks have a fractional multiplication relationship with each of 5 beats with respect to the bar length. Specifically, assuming a music with 5 beats per bar, the shift time/interval lengths corresponding to the power level peaks would have a fractional multiplication relationship, such as 3/5 times, 4/5 times, 5/5 times, 6/5 times, 7/5 times the bar length, and so on so forth.

Although it is possible that the music has other time signatures, it is usually sufficient to assume 3, 4, and 5 time signatures (i.e., beats per bar).

In this embodiment, the following procedure is executed in order to realize the above algorithm. First, for example, for the peaks 501 or 601 of the three-dimensional correlation values as shown in FIG. 5 or FIG. 6, which have been calculated as shown in FIG. 4, the correlation values of the top five peaks, for example, are extracted from the autocorrelation waveform at a particular elapsed time in the y-axis direction. Then, those correlation values are accumulated in the bin position of the histogram corresponding to the respective peak positions (shift interval). This operation is executed for the autocorrelation waveform for each elapsed time in the y-axis direction, and is accumulated in the same histogram.

Figure 7A:
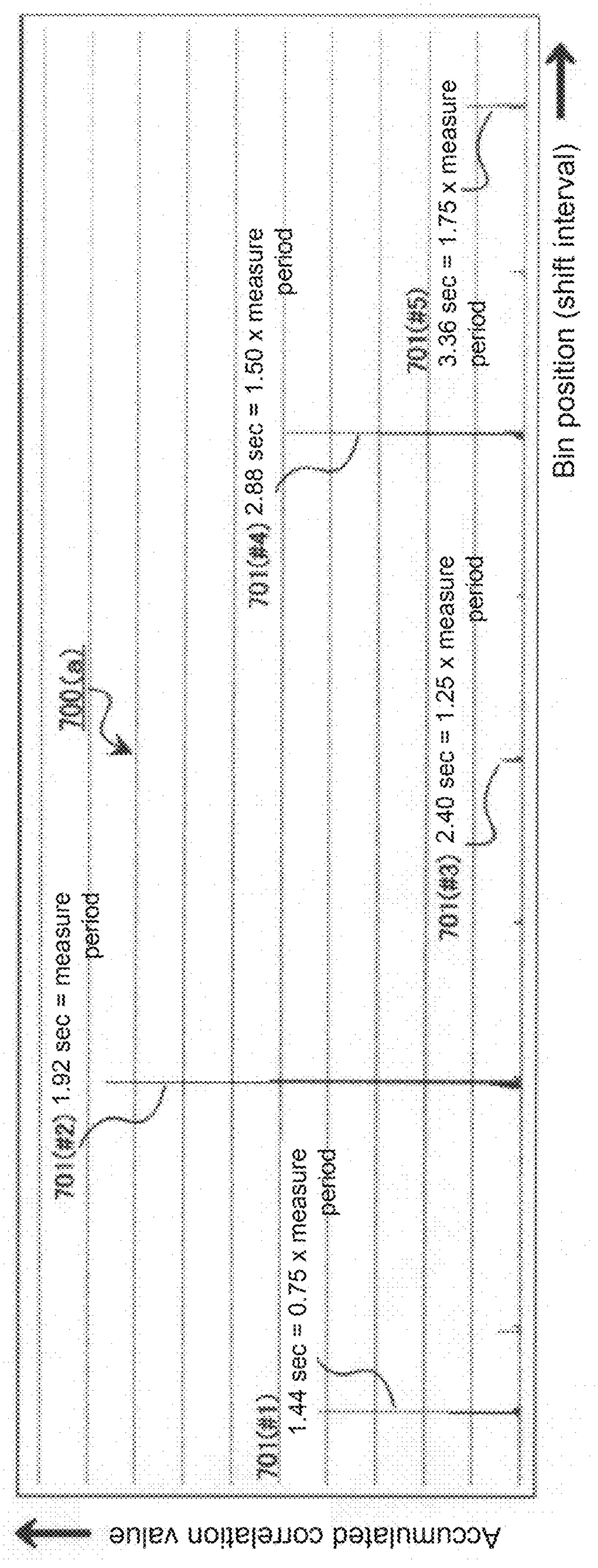
FIGS. 7A-7B are diagrams showing examples of the autocorrelation histogram.

As a result, as a histogram of the correlation values for the four-beat per bar music, the histogram 700 (*a*) of the correlation value exemplified in FIG. 7A can be obtained, for example. In the correlation value histogram 700 (*a*), peaks #1 to #5 correspond to the peaks #1 to #5 of peaks 501 of the correlation values in FIG. 5, and at the bin positions corresponding to those peak positions (shift times/intervals), the histogram peaks 701 of the correlation values are obtained.

Figure 7B:
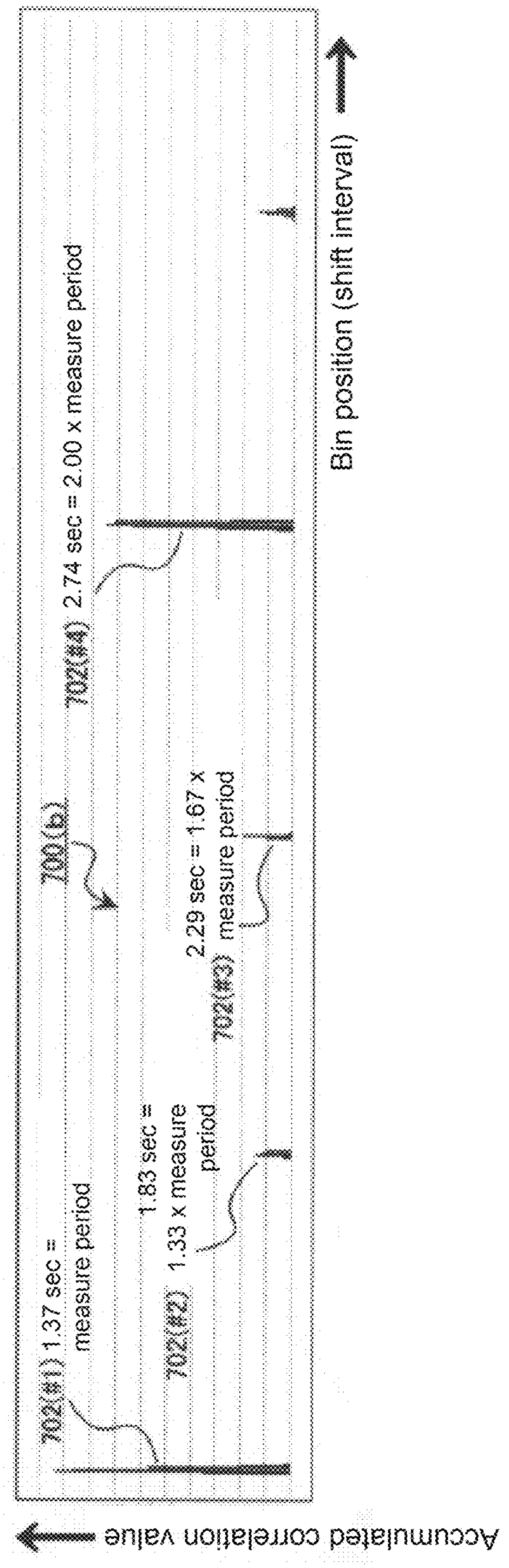

Similarly, as a histogram of the correlation values for the three-beat per bar music, the histogram 700 (*b*) of the correlation values shown in FIG. 7B can be obtained, for example. In the correlation value histogram 700 (*b*), peaks #1 to #4 correspond to the peaks #1 to #4 of the peaks 601 of the correlation values in FIG. 6, and at the bin positions corresponding to their peak positions (shift times/intervals), the histogram peaks 702 of the correlation values are obtained.

Subsequently, in the present embodiment, the beat analysis process of FIGS. 8, 9, and 12, which will be described later, and the examination process for the assumed time signatures are executed. In these processes, for each of the peak positions of the peaks 701 of the histograms of the correlation values up to, for example, the top 7 values extracted from the correlation value histogram 700 (*a*) obtained as shown in FIG. 7A, for example, it is first assumed that for each of the peaks the bin position corresponding to the peak position (shift interval) is the measure time length. Then, a process of determining whether or not two or more of the other bin positions (shift intervals) corresponding to the other peaks 701 of the histogram has any of the fractional multiplication relationship for the four beats described above is executed. If this determination result is affirmative, it is determined that the bar time length assumed above is correct, the bar time length of the four beats is determined, and the tempo is also determined at the same time.

If the correlation value histogram 700 is not 700 (a) in FIG. 7A but 700 (b) in FIG. 7B, then the above-described determination process is not affirmative with respect to any of the peaks 702 of the extracted correlation value histogram. In such a case, the examination process of the three-beat per bar of FIG. 13, which will be described later, is executed. In this three-beat per bar verification process, for each of the top seven peaks 702 of the histogram of the correlation values extracted from the histogram 700 (*b*) of the correlation values obtained as shown in FIG. 7B, it is assumed that for each of the peaks, the bin position corresponding to the peak position (shift times/intervals) is the measure/bar time length. Then, a process of determining whether or not two or more of the other bin positions (shift intervals) corresponding to the other peaks 702 of the histogram of the correlation values has any of the fractional multiplication relationship for the three beats per bar described above is executed. If this determination result is affirmative, it is determined that the bar length assumed above is correct, the bar time length of the three beats is determined, and the tempo is also determined at the same time.

If the above determination results for the assumed four and three beats per bar are both not affirmative, which means that the correlation value histogram 700 is neither 700 (*a*) in FIG. 7A nor 700 (*b*) in FIG. 7B, the examination process of the five beats per bar of FIG. 14, which will be described later, is executed. In this 5-beat per bar verification process, although not particularly shown, for each of the peaks of the histogram of the correction values extracted above, it is assumed that for each of the peaks, the bin position corresponding to the peak position (shift interval) of the peak is the measure time length. Then, a process of determining whether or not two or more of the other bin positions (shift intervals) corresponding to the other peaks of the histograms of correlation values has any of the fractional multiplication relationship for the five beats per bar described above is executed. If this determination result is affirmative, it is determined that the bar length assumed above is correct, the bar time length of the five beats per bar is determined, and the tempo is also determined at the same time.

As described above, in the present embodiment, it is possible to satisfactorily determine the time signature, the number of beats per bar, from the musical sound data.

Figure 8:
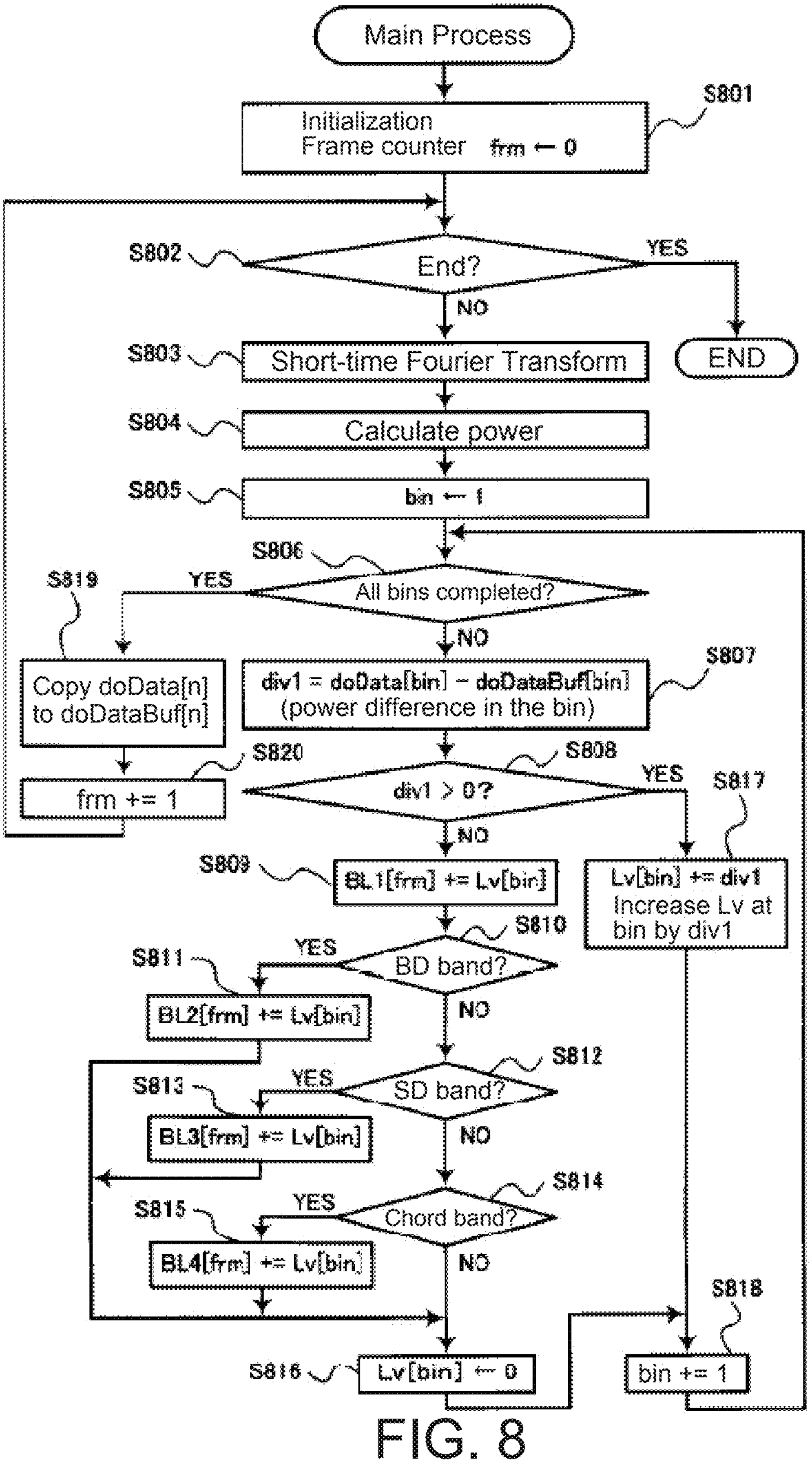
FIG. 8 is a flowchart showing an example of the main process of determining the time signature.

FIG. 8 is a flowchart showing an example of the main process of time signature determination that realizes the operation of the above-described embodiment. This main process is a process in which the CPU 101 of FIG. 1 reads the main process program stored in the ROM 102 into the RAM 103 and executes it. In this main process, the rising portions of the power of the spectral component, which have been calculated by frequency analysis (short-time Fourier transform) for each frequency band so that the characteristics of each instrument or song can be well represented as illustrated in FIG. 2, are derived as the above-described beat levels, which were explained with reference to FIG. 3. This main process is executed for each of the frequency bands that tends to appear as a feature of the rhythm structure. Further, this main process is executed while shifting the time (frame) little by little progressively with respect to the entire music data.

First, as an initialization process, the CPU 101 sets/resets the value of the frame counter variable frm, which is a variable stored in the RAM 103 for designating the elapsed time of the music in the unit of frame, which has a fixed interval (for example, 256 to 1024 milliseconds), to 0 (zero) (step S801).

Next, CPU 101 repeats a series of processes from step S802 to step S820 while incrementing the value of the frame counter variable frm by +1 in step S820 until it determines in step S802 that the processing is completed for all the frames of the music data.

In this iterative process, the CPU 101 first executes a short-time Fourier transform operation, which is a frequency analysis process, on the music data of the current frame indicated by the frame counter variable frm, which has been read from the input unit 104 of FIG. 1 into the RAM 103 (step S803).

Next, the CPU 101 calculates the power of each frequency component from each frequency component calculated by the calculation of the short-time Fourier transform in step S803 (step S804). The power value for each frequency component is stored in the power array variable doData [bin], which is an array variable on the RAM 103, using the bin value, which is the frequency position of the frequency component, as a key.

Subsequently, the CPU 101 resets the value of the bin variable, which is a variable stored in the RAM 103 for designating the bin value described above, to 1 in step S805, and repeats a series of processes from step S806 to step S818 for each bin value by incrementing the value of the bin variable by +1 in step S818 until it determines in step S806 that the processes have been completed for all the bin values.

In the iterative processing for the bin value, the CPU 101 first subtracts, from the value of the current frame power array variable doData [bin], stored in the RAM 103, for the current frame for the current bin (frequency component) value indicated by the bin variable, the value of the previous frame power array variable doDataBuf [bin] stored in the RAM 103 for the same bin value in the frame immediately before. Then, the CPU 101 stores the difference value, which is the subtraction result, in the difference value variable div1 which is a variable stored in the RAM 103 (step S807). This difference value shows the change in power between the previous frame and the current frame.

Next, the CPU 101 determines whether or not the value of the difference value variable div1 calculated in step S807 is larger than 0 (zero) (step S808). In this determination process, whether the power corresponding to the current bin (frequency component) value in the current frame has a positive fluctuation (increasing) or a negative fluctuation (decreasing) (including no fluctuation) is determined.

If the power fluctuation of the current bin (frequency component) value in the current frame is a positive fluctuation and the determination in step S808 is YES, the CPU 101 executes the next process. The CPU 101 adds the value of the difference value variable div1 calculated in step S807 to the level array variable Lv [bin], which is an array variable stored in the RAM 103 indicating the power level value for the current bin (frequency component) value, as the amount of the level increases (step S817). In step S817 of FIG. 8, the operation symbol "+=" indicates an operation of accumulating/adding the value on the right side to the variable on the left side.

After the process of step S817, the CPU 101 increments the value of the bin variable by +1 in step S818, moves the process to step S806 to the process of step S807, and repeats the process for the next bin (frequency component) value.

Eventually, the power fluctuation of the current bin (frequency component) value in the current frame turns to negative fluctuation (or no fluctuation), the value of the difference value variable div1 therefore becomes 0 or less, and the determination in step S808 becomes NO. This means that the frame fp has arrived in FIG. 3 described above.

At this point, the level array variable Lv [bin] contains the beat levels shown in FIG. 3 corresponding to the current bin (frequency component) value. First, the CPU 101 adds the value of this level array variable Lv [bin] to the first beat level fluctuation waveform array variable BL1 [frm], which is an array variable stored in the RAM 103 that represents the beat level in the current frame (indicated by the frame counter variable frm) in the entire frequency band, which is also referred to as the "first frequency band" (step S809). The first frequency band has a frequency range of 0 to 22050 Hz, for example, when the sampling frequency is 44.1 KHz (kilohertz).

Next, the CPU 101 determines whether or not the current bin (frequency component) value indicated by the value of the bin variable belongs to the BD (bass drum) band (step S810). The BD band has, for example, a frequency range of 20 to 100 Hz and corresponds to, for example, band A in FIG. 2.

If the determination in step S810 is YES, the CPU 101 add the value of the level array variable Lv [bin] to the second beat level fluctuation waveform array variable BL2 [frm], which is an array variable stored in the stored RAM 103 that represents the beat level in the current frame (indicated by the value of the frame counter variable frm) in the BD band, which is one of the "second frequency bands" (step S811). After that, the CPU 101 moves the process to step S816.

If the determination in step S810 is NO, the CPU 101 determines whether or not the current bin (frequency component) value indicated by the value of the bin variable belongs to the SD (snare drum) band (step S812). The SD band has, for example, a frequency range of 125 to 250 Hz and corresponds to, for example, band B in FIG. 2.

If the determination in step S812 is YES, the CPU 101 adds the value of the level array variable Lv [bin] to the third beat level fluctuation waveform array variable BL3 [frm], which is an array variable stored in the stored RAM 103 (step S813) that represents the beat level in the current frame (indicated by the value of the frame counter variable frm) in the SD band, which is another one of the second frequency bands. After that, the CPU 101 moves the process to step S816.

If the determination in step S812 is NO, the CPU 101 determines whether or not the current bin (frequency component) value indicated by the value of the bin variable belongs to the chord band (step S814). The chord band has, for example, a frequency range of 300 to 600 Hz and corresponds to, for example, band C in FIG. 2.

If the determination in step S814 is YES, the CPU 101 adds the value of the level array variable Lv [bin] to the fourth beat level fluctuation waveform array variable BL4 [frm], which is an array variable stored in the stored RAM 103 (step S815) that represents the beat level in the current frame (indicated by the value of the frame counter variable frm) in the chord band, which is another one of the second frequency bands. After that, the CPU 101 moves the process to step S816.

After the processing of step S811, step S813, or step S815, or when the determination in step S814 is NO, the CPU 101 sets (clears) the value of the level array variable Lv [bin] corresponding to the current bin (frequency component) value to 0 (step S816). After that, the CPU 101 increments the value of the bin (frequency component) value by +1 (step S818), moves the process to step S806 to the process of step S807, and repeats the processes for the next bin (frequency component) value.

When the processing for all bin (frequency component) values is completed by repeating the processing from step S806 to step S818, the determination in step S806 becomes YES. As a result, the CPU 101 sets the current frame power array variable doData [n] corresponding to all the bin (frequency component) values for the current frame stored in the RAM 103 to the previous frame power array variable doDataBuf [n] (here, n represents all the bin values) and stores it in RAM 103 (step S819).

After that, the CPU 101 increments the value of the frame counter variable frm by +1 (step S820), moves the process to step S802 to step S803, and repeats the processes for the next frame.

Eventually, when the processing for all the frames up to the end of the music data is completed, the determination in step S802 becomes YES, and the main processing of FIG. 8 ends.

Thus, the above main processing obtains the first beat level fluctuation waveform BL1 [frm] in the first beat level fluctuation waveform array variable BL1 [frm] for the entire frequency band (referred to as the first band here); the second beat level fluctuation waveform BL2 [frm] in the second beat level fluctuation waveform array variable BL2 [frm] for the BD band; the third beat level fluctuation waveform BL3 [frm] in the third beat level fluctuation waveform array variable BL3 [frm] for SD band; and the fourth beat level fluctuation waveform BL4 [frm] in the fourth beat level fluctuation waveform array variable BL4 [frm] for the chord band, for the entire song data, each of which looks like the beat level fluctuation waveform 302 shown in (b) of FIG. 3.

Figure 9:
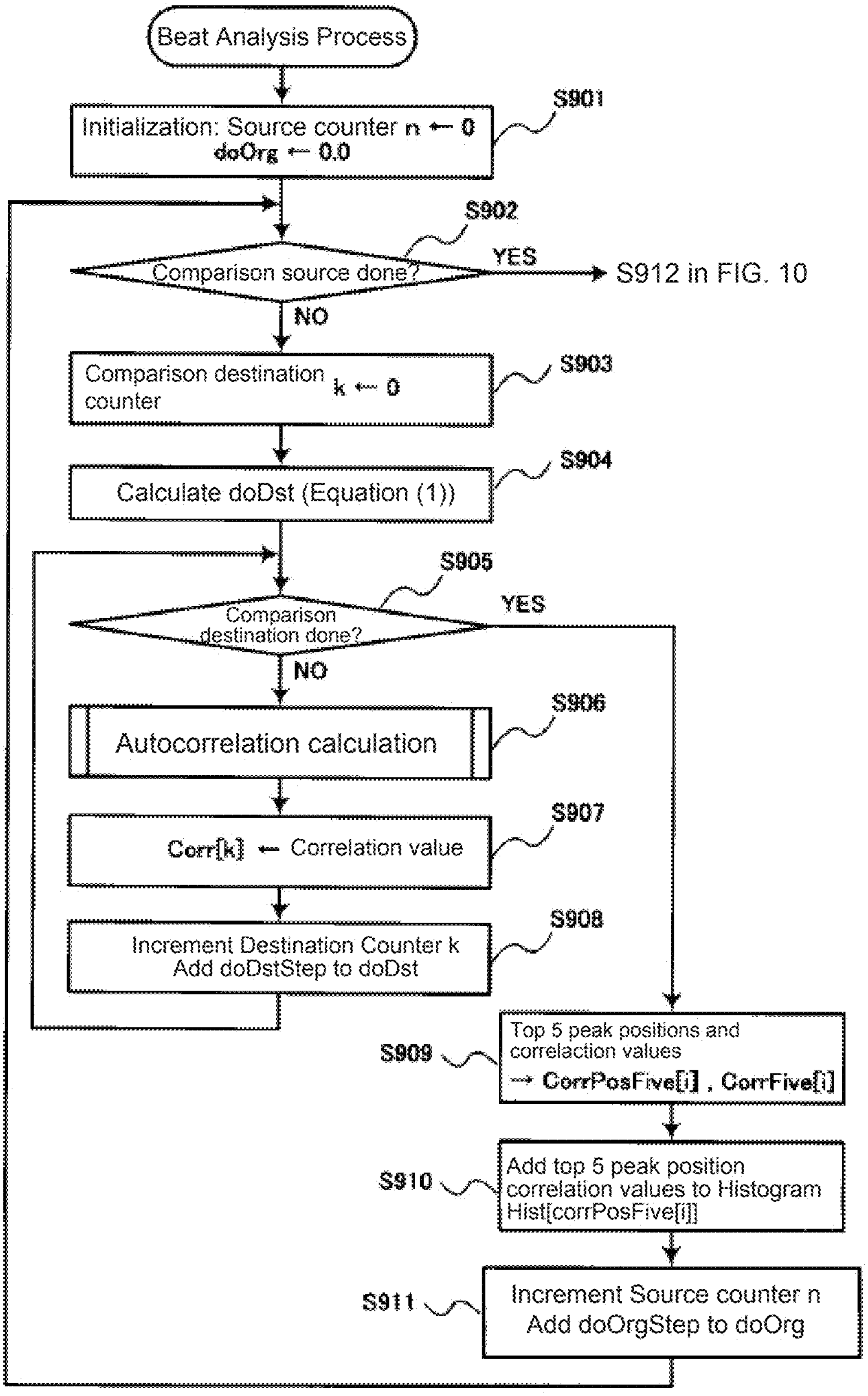
FIG. 9 is a flowchart showing an example of beat analysis processing.
Figure 10:
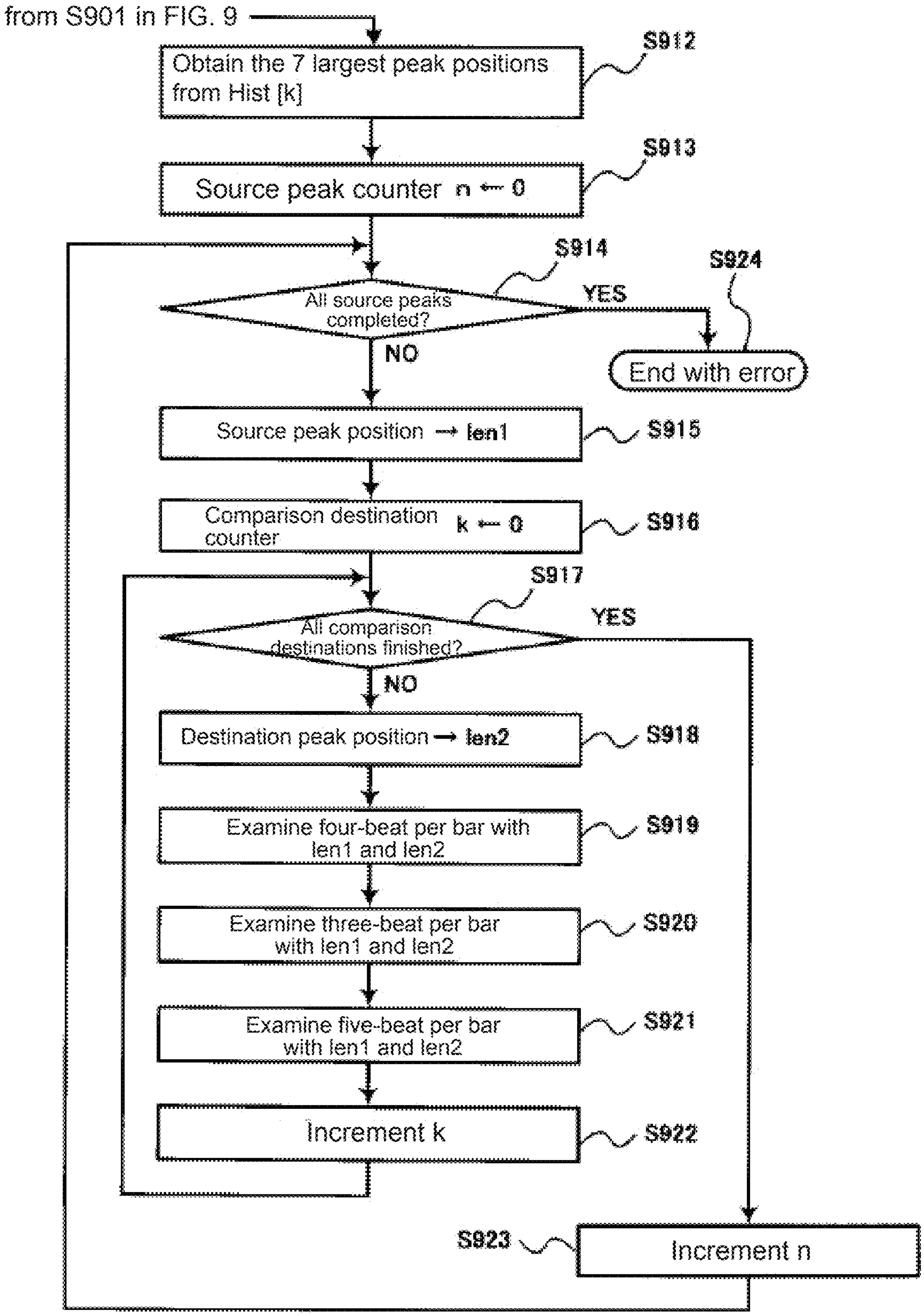
FIG. 10 is a continuation of the flowchart of FIG. 9.

FIGS. 9 and 10 are flowcharts showing an example of beat analysis processing. The beat analysis process is a process in which the CPU 101 of FIG. 1 reads the beat analysis process program stored in the ROM 102 into the RAM 103 and executes it, as in the case of the main process.

In this beat analysis process, first, as described above with reference to FIG. 3, the weighted average beat level fluctuation waveform WAM_BL (Weighted Arithmetic Mean Beat Level) is calculated from the first beat level fluctuation waveform BL1 [fm] for the entire band, the second beat level fluctuation waveform BL2 [frm] for the BD band, the third beat level fluctuation waveform BL3 [frm] for the SD band, and the fourth beat level fluctuation waveform BL4 [frm] for the chord band, which have been obtained in the main process of FIG. 8.

Next, in the beat analysis process, the autocorrelation is calculated for the weighted average beat level fluctuation waveform WAM_BL as described above with reference to FIGS. 4 to 6.

Further, in the beat analysis process, as described above with reference to FIGS. 7A-7B, a histogram of the correlation values (corresponding to 700 in FIGS. 7A-7B) is calculated from the correlation values obtained by the calculation of the autocorrelation.

Then, in the beat analysis process, as described above, the process of estimating the beat per bar of the music data is executed based on the peaks of the histogram of the correlation values.

The above-mentioned calculation process of the weighted average beat level fluctuation waveform WAM_BL and the calculation process of the autocorrelation with respect to the weighted average beat level fluctuation waveform WAM_BL are executed in steps S901 to S908 of FIG. 9. The calculation process for the above-mentioned histogram of the correlation values is executed in steps S909 and S910 of FIG. 9. Further, the process of estimating the time signature of the music data based on the peaks of the histogram of the correlation values described above is executed in steps S912 to S923 of FIG. 10.

Here, as the comparison source head position variable doOrg stored in the RAM 103, the head position of the comparison source data 402 in FIG. 4 is stored as data having a unit of seconds. Similarly, as the comparison destination head position variable doDst stored in the RAM 103, the head position of the comparison destination data 403 in FIG. 4 is stored as data having a unit of seconds. In the following description, the value stored in each variable is indicated by the same symbol as the variable name.

The comparison source head position doOrg [seconds] is set from the beginning to the end of the music piece while being increased by the comparison source time step width doOrgStep [seconds] indicated by the comparison source time step width variable doOrgStep stored in the ROM 102 (RAM 103 if the value of the time step width variable is changeable). The value of the comparison source time step width doOrgStep is, for example, 2 seconds.

Further, the value of the comparison destination head position doDst is set so that the tempo range that can be specified as the music data is, for example, from 60 to 180 bpm. In the four-beat per bar music data, the length of the bar is 4 seconds when the tempo is 60 bpm, and the length of the bar is 1.33 seconds when the tempo is 180 bpm. That is, as the comparison destination head position doDst, values between 1.33 [seconds] and 4.00 [seconds] are specified while being progressively shifted with a prescribed resolution. In this embodiment, this shift width is set to the comparison destination time step width doDstStep [seconds] indicated by the comparison destination time step width variable doDstStep recorded in the ROM 102 (RAM 103 if the shift width is changeable). In this case, the comparison destination head position doDst is calculated by the arithmetic processing represented by the following equation (1).

$$doDst = doOrg + 1.33 + k \times doDstStep \quad (1)$$

Here, k is an integer of 0 or more.

In the flowchart of FIG. 9, the CPU 101 first executes the initialization process to set the comparison source counter variable n stored in the RAM 103 that controls the progress of the comparison source data to 0 (zero) and to set the comparison source head position variable doOrg to 0.0 [seconds] representing the beginning of the music data (step S901).

Next, the CPU 101 executes a series of processing from step S902 to step S911, which are executed for each comparison source data, while incrementing the comparison source counter variable n by +1 at step S911 and successively adding the value of the comparison source time step width variable doOrgStep read out from the ROM 102 (or RAM 103 if the step with value is changeable) to the comparison source head variable doOrg until it determines in step S902 that the designation of the comparison source data has reached the end of the music data. By repeating the accumulation process in step S911, a process of advancing the comparison source head position variable doOrg of "doOrg=doOrgStep×n" is executed. For example, in FIG. 4, the lapsed times tn1, tn2, etc., are specified in sequence from the beginning to the end of the music data this way.

In the repetition of the above-mentioned processes for each comparison source data, the CPU 101 first sets the initial value 0 (zero) to the comparison destination counter variable k (see the above equation (1)) stored in the RAM 103 for designating the position of the comparison destination (step S903).

Next, the CPU 101 calculates the initial value of the comparison destination head position doDst by the equation (1) above using the currently designated comparison source head position variable doOrg (see steps S901 and S911) and the value of the comparison destination counter variable k=0 initialized in step S903 (step S904).

Then, the CPU 101 repeats a series of processing from step S905 to step S908 for each comparison destination while incrementing the value of the comparison destination counter variable k by +1 in step S908 and successively adding the value of the comparison destination time step width variable doDstStep reads from ROM 102 (RAM 103 if the time step width is changeable) to the comparison destination head position variable doDst initially set in step S904, until it determines in step S905 that the designation of the comparison destination data is completed.

In the iteration of these processes for each comparison destination, the CPU 101 first executes the autocorrelation calculation process (step S906).

Figure 11:
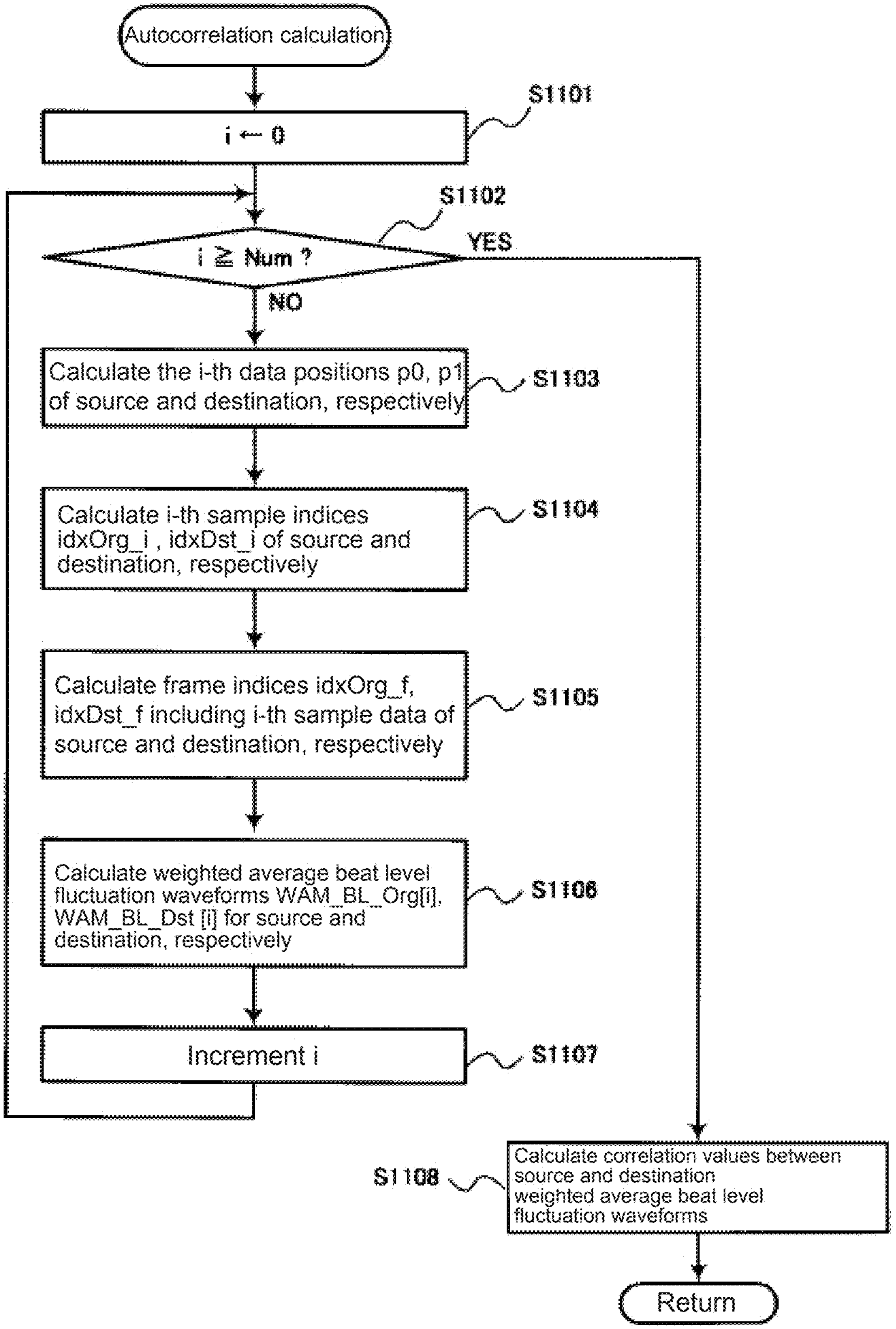
FIG. 11 is a flowchart showing a detailed example of autocorrelation calculation processing.

FIG. 11 is a flowchart showing an example of the autocorrelation calculation process in step S906 of FIG. 9 in detail. In FIG. 11, the CPU 101 sets an initial value 0 (zero) in the counter variable i, which is defined within a set time and to be stored in the RAM 103, that controls the progress within the set time of the comparison source and the comparison destination in step S1101. After that, the CPU 101 repeats a series of processes from step S1102 to step S1107 for the set time while incrementing the value of the counter variable i for the set time by +1 in step S1107, until it determines that the counter variable i within the set time reaches the set time sample number Num stored in the ROM 102 (RAM 103 if Num is changeable), which corresponds to the set time T (see FIG. 4) in step S1102.

In the iteration of the processes within the set time described above, the CPU 101 first calculates the i-th data positions p0 and p1 [seconds] within the set time for the comparison source data and the comparison destination data, respectively, based on the arithmetic processes represented by the following equations (2) and (3) (step S1103).

$$p0 = doOrg + i \times 4 \times (doDst - doOrg) / Num \tag{2}$$

$$p1 = doDst + i \times 4 \times (doDst - doOrg) / Num \tag{3}$$

In the above equations (2) and (3), when the value of the counter variable i within the set time becomes the value of the set time sample number Num corresponding to the set time T in FIG. 4, each of the data position calculated by the formulae (2) and (3) is "4×(doDst−doOrg)" greater than the respective initial positions. That is, the set time T here is set to be four times the shift interval of the comparison destination data with respect to the comparison source data.

According to the arithmetic processing shown by the above equations (2) and (3), the set time T is not a fixed time but a value "4×(doDst−doOrg)" which is four times the shift interval between the comparison destination data and the comparison source data, and depends on the time range corresponds to the shift interval. In this way, the set time Tis appropriately set according to the shift interval for autocorrelation calculations.

Next, the CPU 101 executes the arithmetic calculations represented by the following equations (4) and (5) based on the i-th data positions p0 and p1 [seconds] within the set time of the comparison source data and the set time of the comparison destination data calculated by the operations of the above equations (2) and (3), respectively. As a result, the CPU 101 calculates the comparison source i-th sample index idxOrg_i and the comparison destination i-th sample index idxDst_i, which are indexes to the i-th sample data within the set time of the comparison source data and the set time of the comparison destination data, respectively (step S1104).

$$\text{idxOrg\_i} = p0 \times \text{sampling frequency [Hz]} \tag{4}$$

$$\text{idxDst\_i} = p1 \times \text{sampling frequency [Hz]} \tag{5}$$

Subsequently, the CPU 101 calculates the comparison source frame index idxOrg_f and the comparison destination frame index idxDst_f, which are respectively frame numbers that include the comparison source i-th sample index idxOrg_i and the comparison destination i-the sample index idxDst_i, respectively, calculated by the operations of the equations (4) and (5), by the arithmetic processing represented by the following equations (6) and (7) (step S1105). Here, fsize is a frame size (unit is "sample").

$$\text{idxOrg\_f} = \text{idxOrg\_i} / fsize \tag{6}$$

$$\text{idxDst\_f} = \text{idxDst\_i} / fsize \tag{7}$$

Then, the CPU 101 executes the arithmetic processing represented by the following equation (8) using the comparison source frame index idxOrg_f calculated by the arithmetic of the above equation (6) as a key.

$$\begin{aligned}\text{WAM\_BL\_Org}[i] = {} & A \times \text{1st beat level fluctuation waveform } BL1[\text{idxOrg\_f}] + \\ & B \times \text{2nd beat level fluctuation waveform } BL2[\text{idxOrg\_f}] + \\ & C \times \text{3rd beat level fluctuation waveform } BL3[\text{idxOrg\_f}] + \\ & D \times \text{4th beat level fluctuation waveform } BL4[\text{idxOrg\_f}]\end{aligned} \tag{8}$$

Thus, by this arithmetic processing, the CPU 101 uses the weighting coefficients A, B, C, and D to calculate the comparison source weighted average beat level fluctuation waveform WAM_BL_Org [i] from the first beat level fluctuation waveform BL1 [idxOrg_f], the second beat level fluctuation waveform BL2 [idxOrg_f], the third beat level fluctuation waveform BL3 [idxOrg_f], and the fourth beat level fluctuation waveform BL4 [idxOrg_f] (step S1106). Here, the weight coefficients A, B, C, and D are stored in, for example, the ROM 102, or, if they are changeable, are stored in the RAM 103. Here, the first beat level fluctuation waveform BL1 [idxOrg_f], the second beat level fluctuation waveform BL2 [idxOrg_f], the third beat level fluctuation waveform BL3 [idxOrg_f], and the fourth beat level fluctuation waveform BL4 [idxOrg_f] have been calculated in steps S809, S811, S813, and S815 of the flowchart of FIG. 8, respectively, and have been stored in the RAM 103, respectively.

Similarly, the CPU 101 executes the arithmetic processing represented by the following equation (9) using the comparison destination frame index idxDst_f calculated by the arithmetic of the above equation (7) as a key.

$$\begin{aligned}\text{WAM\_BL\_Dst}[i] = \quad & (9)\\ A\times\text{1st beat level fluctuation waveform } BL1[\text{idxDst\_f}] + \\ B\times\text{2nd beat level fluctuation waveform } BL2[\text{idxDst\_f}] + \\ C\times\text{3rd beat level fluctuation waveform } BL3[\text{idxDst\_f}] + \\ D\times\text{4th beat level fluctuation waveform } BL4[\text{idxDst\_f}]\end{aligned}$$

By this arithmetic processing, the CPU 101 uses the above-mentioned weighting coefficients A, B, C, and D to calculate the comparison destination weighted average beat level fluctuation waveform WAM_BL_Dst [i] from the first beat level fluctuation waveform BL1 [idxDst_f], the second beat level fluctuation waveform BL2 [idxDst_f], and the third beat level fluctuation waveform BL3 [idxDst_f], and the fourth beat level fluctuation waveform BL4 [idxDst_f] (also in step S1106). Here, the first beat level fluctuation waveform BL1 [idxDst_f], the second beat level fluctuation waveform BL2 [idxDst_f], the third beat level fluctuation waveform BL3 [idxDst_f], and the fourth beat level fluctuation waveform BL4 [idxDst_f] have been calculated in step S809, step S811, step S813, and step S815 in the flowchart of FIG. 8, respectively, and have been stored in the RAM 103, respectively.

After that, the CPU 101 increments the counter variable i within the set time by +1 and moves the process to step S1103 via step S1102, and repeats the arithmetic processes for the next position i within the set time T.

Eventually, when the value of the counter variable i within the set time reaches the set time sample number Num, which is the end position corresponding to the set time T, i≥ Nu in step S1102, and the determination thereof becomes YES, the CPU 101 executes the next processing. The CPU 101 calculates the correlation coefficient corr, which is a correlation value, by a known autocorrelation calculation represented by the following equation (10), for example, based on the comparison source weighted average beat level fluctuation waveform WAM_BL_Org [i] and the comparison destination weighted average beat level fluctuation waveform WAM_BL_Dst [i] (0≤i<Num) corresponding to the set time T, which have been calculated as described above (step S1108).

$$\begin{aligned}\text{corr} = \text{Cov}(\text{WAM\_BL\_Org}[i], \quad & (10)\\ \text{WAM\_BL\_Dst}[i] / (\sigma(\text{WAM\_BL\_Org}[i]) \times \sigma(\text{WAM\_BL\_Dst}[i])), \\ \text{where, } (0 \le i < Num)\end{aligned}$$

Here, Cov (X, Y) is a functional operation of calculating the covariance of the values X and Y. Further, σ (X) is a functional operation of calculating the standard deviation of the value X.

This completes the autocorrelation calculation process of step S906 of FIG. 9 shown in the flowchart of FIG. 11 with respect to the comparison source data and the comparison destination data having the current deviation time "k×doDstStep" indicated by the comparison destination counter variable k.

Returning to the description of the flowchart of FIG. 9, the CPU 101 sets the correlation coefficient corr calculated by the arithmetic processing represented by the equation (10) in the correlation coefficient array corr [k] corresponding to the comparison destination counter variable k and stores it in RAM 103 (step S907).

After that, the CPU 101 increments the value of the comparison destination counter variable k by +1 and accumulates the value of the comparison destination time step width variable doDstStep to the value of the comparison destination head position variable doDst (step S908). Then, the CPU 101 moves the process to step S905 to the process of S906, and repeats the autocorrelation calculation process for the next comparison destination data.

Eventually, when the iterative processing corresponding to the values of all the comparison destination counter variables k is completed and the determination in step S905 is YES, the CPU 101 executes the next processing. The CPU calculates the top 5 peak positions and their correlation values from the autocorrelation waveform that has been calculated for the comparison source data with respect to the current elapsed time indicated by the value of the comparison source counter variable n, which has been obtained by repeating the above steps S902 to S908, as described with reference to FIGS. 7A-7B, and store them in the array variables CorrPosFive [j] and CorrFive [j] (0≤j≤4), which are to be stored in the RAM 103, respectively (step S909).

Subsequently, as described above in FIGS. 7A-7B, with respect to each of the bin positions corresponding to the top 5 peak positions CorrPosFive [j], which have been calculated in step S909 for the histogram Hist of the correlation values, which is an array variable stored in the RAM 103, the CPU 101 append the Hist as "Histogram [CorrPosFive [j]+=CorrFive [j] (0≤j≤4)" (step S910).

After that, the CPU 101 increments the value of the comparison source counter variable n by +1 and adds the value of the comparison source time step width variable doOrgStep to the value of the comparison source head position variable doOrg (step S911). Then, the CPU 101 moves the process to step S902 to the process of S903, and repeats the autocorrelation calculation process for the next comparison source data.

Eventually, when the processing for all the comparison source data is completed and the determination in step S902 becomes YES, the CPU 101 executes the processing beginning at step S912 in FIG. 10.

First, the CPU 101 acquires the peak positions of top 7 values of the histogram of the correlation values from the histogram Hist [k] (step S912). Here, the histogram Hist [k] has been obtained by the above-mentioned processing of step S909 and step S910 of FIG. 9, and k is the comparison destination counter variable value (see the above equation (1)) that specifies the shift interval from 1.33 seconds to 4 seconds, for example, as explained with reference to FIG. 4 above.

Next, the CPU 101 sets the first peak number of 0 of the seven peaks acquired in step S912 in the peak comparison source counter variable n (step S913). After that, the CPU 101 sequentially designates the value of the peak comparison source counter variable n while incrementing by +1 in step S923 until it is determined that all the designations have been completed in step S914. Then, the CPU 101 sets the peak position (=shift interval length) indicated by the peak comparison source counter variable n in the source peak comparison length variable len1 stored in the RAM 103 (step S915).

Subsequently, every time the peak comparison source counter variable n is specified and one peak comparison source is specified, the CPU 101 sets the first peak number of zero (0), among seven peaks, which have been acquired in step S912, in the peak comparison destination counter variable k (step S916). After that, the CPU 101 repeats the steps thereafter while incrementing the value of the peak comparison destination counter variable k by +1 in step S922 until it is determined in step S917 that all the designations have been completed.

Then, the CPU 101 first stores the peak position (=shift interval length) indicated by the peak comparison destination counter variable k in the destination peak comparison destination length variable len2 and stores it in the RAM 103 (step S918).

After that, the CPU 101 successively assumes 4 beats per bar, 3 beats per bar, and 5 beats per bar in this order in steps S919, S920, and S921, respectively. Under each assumption, the CPU 101 assumes that the value of the source peak comparison length variable len1 is the bar time length. Then, the CPU 101 sequentially determines whether the ratio len2/len1 calculated using the value of the destination peak comparison length variable len2 specified in step S918 satisfies any of the above-mentioned fractional multiplication relationships for four beats per bar, three beats per bar, and five beats per bar, respectively.

Figure 12:
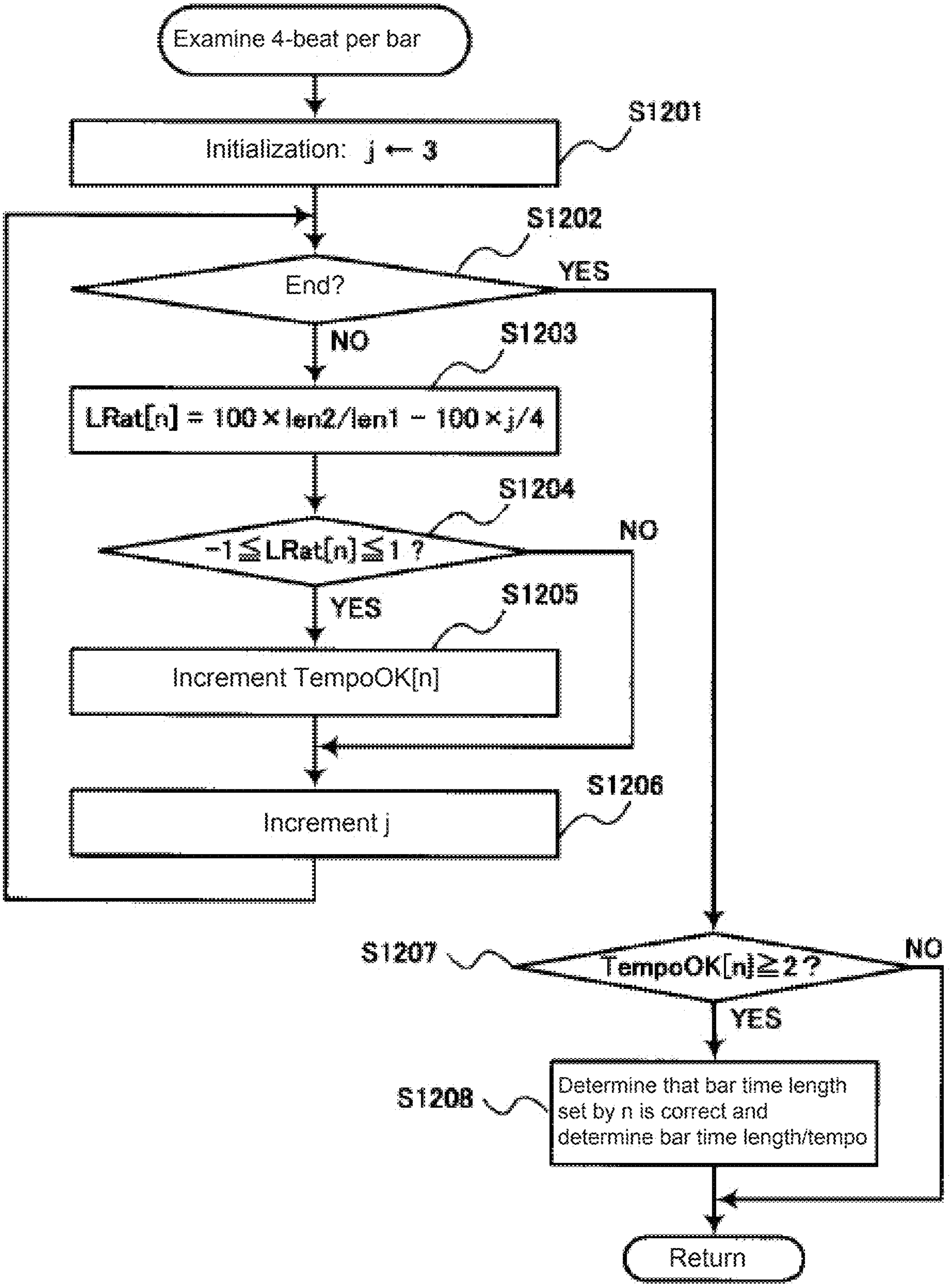
FIG. 12 is a flowchart showing a detailed example of the examination process for 5 beats per bar.

FIG. 12 is a flowchart showing an example of this four-beat per bar examination process in step S919 of FIG. 10 in detail. The CPU 101 initially sets the variable j stored in the RAM 103 that specifies the magnification factor of the four beats to 3 (step S1201). After that, the CPU 101 executes the operation represented by the following equation (11) (step S1203) and the determination process represented by the following equation (12) (step S1204) while incrementing the value of the variable j by +1 (step S1206) until it is determined in step S1202 that the comparison process for, for example, seven peaks is completed (see step S912 in FIG. 10).

$$LRat[n] = 100 \times len2 / len1 - 100 \times j/4 \tag{11}$$

$$-1 \leq LRat[n] \leq 1 \tag{12}$$

The equation (11) calculates a differential between the ratio of the value of the destination peak comparison length variable len2 to the value of the source peak comparison length variable len1 and each fractional magnification factor j/4, which is sequentially specified by the iteration of step S1203. Then, when the determination process of the equation (12), which is sequentially executed by the iteration of step S1204, becomes affirmative, it is determined that the ratio len2/len1 matches or substantially matches the four-beat fractional magnification factor j/4 for the current value of j.

When the determination in step S1204 becomes YES, the CPU 101 increments the value of the variable TempoOK [n] stored in the RAM 103 (step S1205). Note that this variable value is reset to 0 (zero) each time the value of the peak comparison source counter variable n is changed in step S923 in FIG. 10.

When the determination in step S1202 becomes YES and the above-mentioned iterative processing is completed, the CPU 101 determines whether or not the value of the variable TempoOK [n] is 2 or more, that is, the ratio of len2/len1 matches or substantially matches a magnification factor j/4 for 4 beats per bar two or more times (step S1207).

If the determination in step S1207 is YES, the CPU 101 determines that the currently assumed bar time length is correct, determines the bar time length of the four beats per bar, and at the same time determines the tempo (step S1208).

If the determination in step S1207 is NO, the CPU 101 skips the process in step S1208 and does not determine the measure time length and tempo.

After that, the CPU 101 ends the examination process for four-beat per bar in step S919 of FIG. 10 shown in the flowchart of FIG. 12. Here, if the measure/bar time length and tempo are determined by executing step S1208, the CPU 101 ends the beat analysis process shown in the flowcharts of FIGS. 9 and 10, and displays the thus determined measure length and tempo value on the display unit 105 of FIG. 1.

Figure 13:
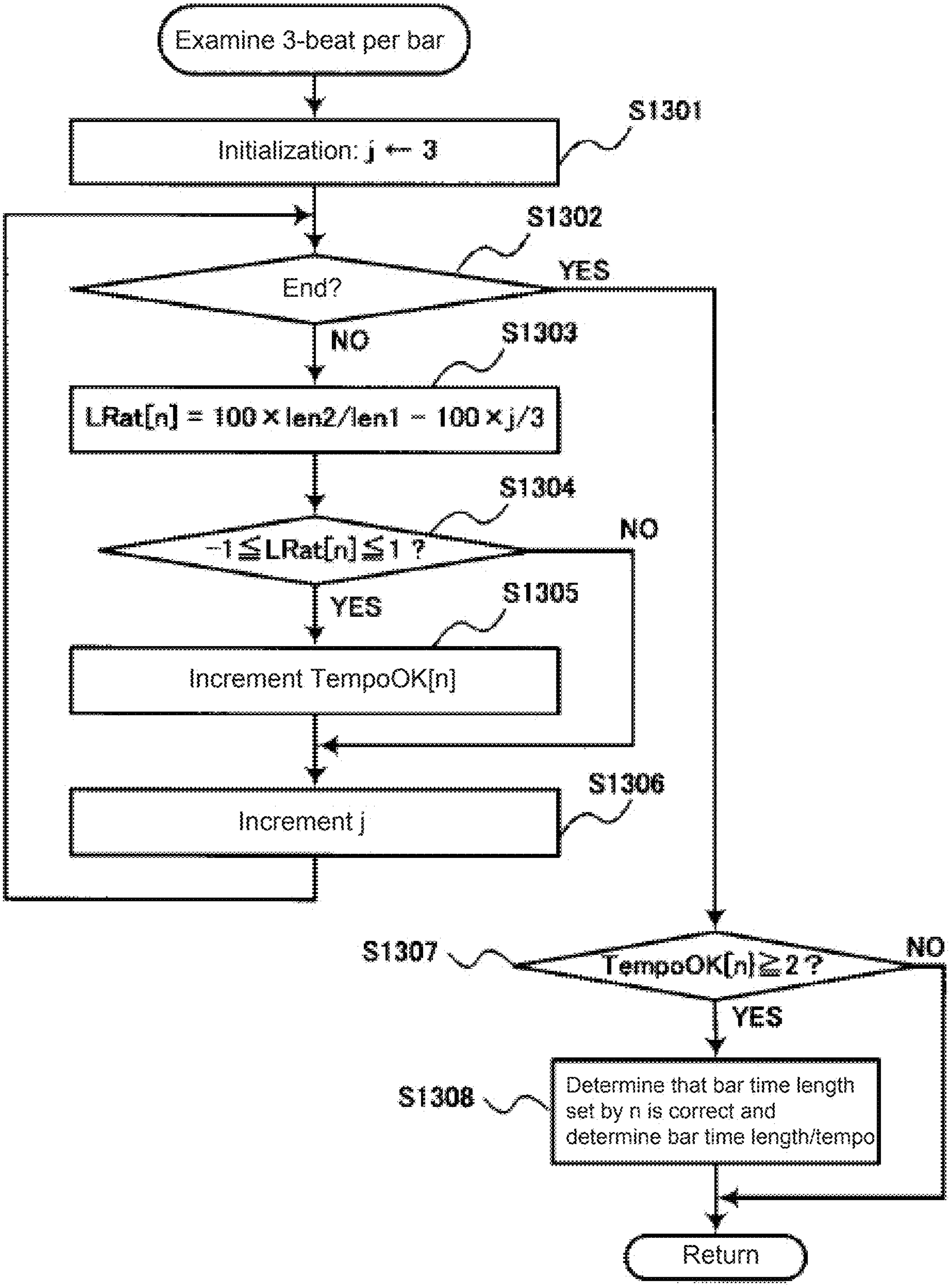
FIG. 13 is a flowchart showing a detailed example of the examination process for 3 beats per bar.

On the other hand, if the bar time length and tempo are not determined in the examination process of step S919, the CPU 101 then executes the examination process of three beats per bar (step S920). FIG. 13 is a flowchart showing an example of the three-beat per bar examination process in detail.

The CPU 101 initially sets the variable j stored in the RAM 103 that specifies the magnification factor of the triple time to 3 (step S1301). After that, the CPU 101 repeatedly executes the operation represented by the following equation (13) (step S1303) and the determination process represented by the equation (12) described above (step S1304) while incrementing the value of the variable j by +1 (step S1306) until it is determined in step S1302 that the comparison process for, for example, seven peaks is completed (see, step S912 in FIG. 10).

$$LRat[n] = 100 \times len2 / len1 - 100 \times j/3 \tag{13}$$

The equation (13) calculates a differential between the ratio of the value of the destination peak comparison length variable len2 to the value of the source peak comparison length variable len1 and each fractional magnification factor j/3 of the three beats per bar that is sequentially specified by the iteration of step S1303. Then, when the determination process of the equation (12), which is sequentially executed by the iteration of step S1304, becomes affirmative, it is determined that the ratio len2/len1 matches or substantially matches the fractional magnification j/3 for the three beats per bar corresponding to the value of the current variable j.

When the determination in step S1304 becomes YES, the CPU 101 increments the value of the variable TempoOK [n] stored in the RAM 103 (step S1305). Note that this variable value is reset to 0 (zero) each time the value of the peak comparison source counter variable n is changed in step S923 in FIG. 10.

When the determination in step S1302 becomes YES and the above-mentioned iterative processing is completed, the CPU 101 determines whether or not the value of the variable TempoOK [n] is 2 or more, that is, the ratio of len2/len1 matches or substantially matches a fractional magnification factor j/3 for 3 beats per bar two or more times (step S1307).

If the determination in step S1307 is YES, the CPU 101 determines that the currently assumed bar time length is correct, determines the bar time length of the three beats, and at the same time determines the tempo (step S1308).

If the determination in step S1307 is NO, the CPU 101 skips the process in step S1308 and does not determine the measure time length and tempo.

After that, the CPU 101 ends the examination process of the three-beat per bar of step S920 in the flowchart shown in FIG. 10. Here, if the measure/bar time length and tempo are determined by executing step S1308, the CPU 101 ends the beat analysis process shown in the flowcharts of FIGS. 9 and 10, and displays the thus determined measure length and tempo value on the display unit 105 of FIG. 1.

On the other hand, if the measure time length and tempo are not determined in the examination process of step S920, the CPU 101 subsequently executes the examination process for 5 beats per bar (step S921). FIG. 14 is a flowchart showing an example of the five-beat per bar examination process in detail.

The CPU 101 initially sets the variable j stored in the RAM 103 that specifies the magnification factor for 5 beats per bar to 3 (step S1401). After that, the CPU 101 repeatedly executes the operation represented by the following equation (14) (step S1403) and the determination process represented by the equation (12) described above (step S1404) while incrementing the value of the variable j by +1 (step S1406) until it is determined in step S1402 that the comparison process for, for example, seven peaks is completed (see step S912 in FIG. 10).

$$LRat[n] = 100 \times len2 / len1 - 100 \times j / 5 \quad (14)$$

The equation (14) calculates a differential between the ratio of the value of the destination peak comparison length variable len2 to the value of the source peak comparison length variable len1 and each fractional magnification factor j/5 sequentially specified by the iteration of step S1403. Then, when the determination process of the equation (12), which is sequentially executed by the iteration of step S1404, becomes affirmative, it is determined that the ratio len2/len1 matches or substantially matches the fractional magnification j/5 for the five beats per bar corresponding to the value of the current variable j.

When the determination in step S1404 becomes YES, the CPU 101 increments the value of the variable TempoOK [n] stored in the RAM 103 (step S1405). Note that this variable value is reset to 0 (zero) each time the value of the peak comparison source counter variable n is changed in step S923 in FIG. 10.

When the determination in step S1402 becomes YES and the above-mentioned iterative processing is completed, the CPU 101 determines whether or not the value of the variable TempoOK [n] is 2 or more, that is, the ratio of len2/len1 matches or substantially matches a magnification factor j/5 for 5 beats per bar two or more times (step S1407).

If the determination in step S1407 is YES, the CPU 101 determines that the currently assumed bar time length is correct, determines the bar time length of the five beats per bar, and at the same time determines the tempo (step S1408).

If the determination in step S1407 is NO, the CPU 101 skips the process in step S1408 and does not determine the measure time length and tempo.

Figure 14:
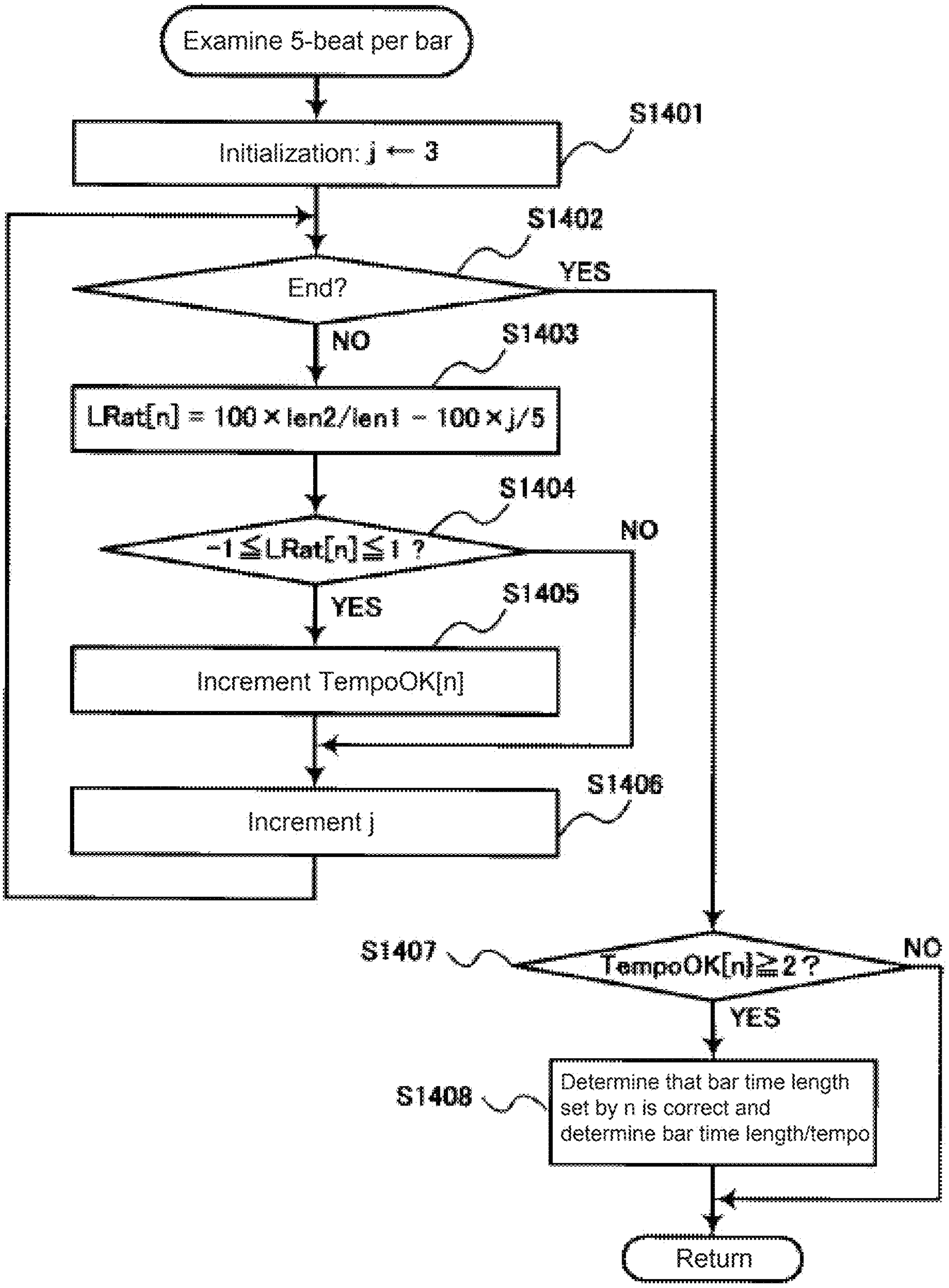
FIG. 14 is a flowchart showing a detailed example of the examination process of 5 beats per bar.

After that, the CPU 101 ends the examination process of the five beats of step S921 in the flowchart shown in FIG. 14. Here, if the measure/bar time length and tempo are determined by executing step S1408, the CPU 101 ends the beat analysis process shown in the flowcharts of FIGS. 9 and 10, and displays the thus determined measure length and tempo value on the display unit 105 of FIG. 1.

On the other hand, if the measure time length and tempo are not determined in the examination process of step S921, the CPU 101 increments the value of the peak comparison destination counter variable k by +1 in step S922. After that, the CPU 101 moves the process to step S917 to the process of step S918, and repeatedly executes the above-mentioned process for the next peak number among, for example, seven peaks acquired in step S912.

Eventually, when the above processing is completed for all of the seven peaks acquired in step S912 and the determination in step S914 becomes YES, the CPU 101 displays an error message indicating that the bar length and tempo were not determined on the display unit 105 of FIG. 1, and the beat analysis process exemplified in the flowcharts of FIGS. 9 and 10 is terminated (step S924).

Figure 15:
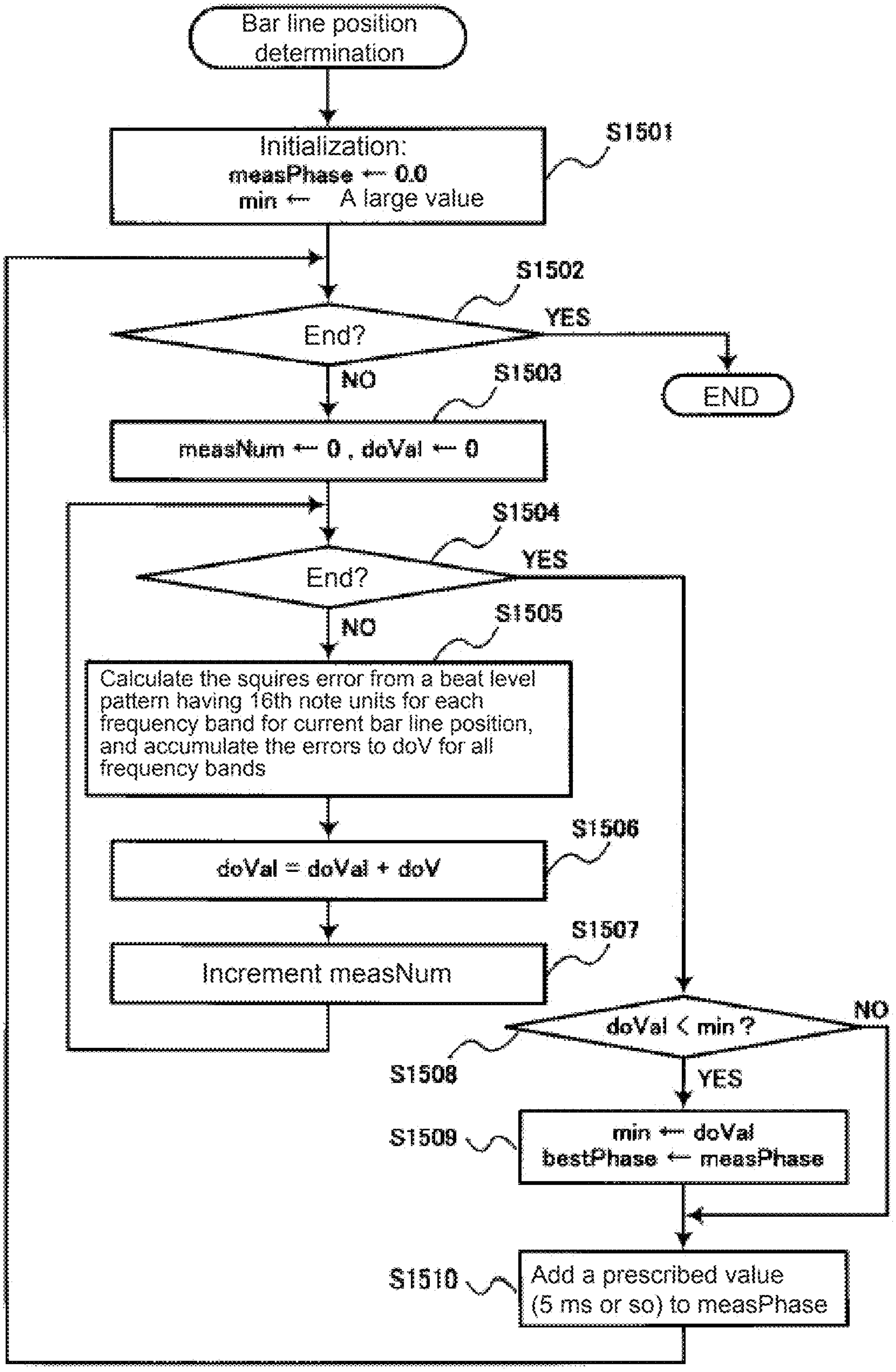
FIG. 15 is a flowchart showing an example of a bar line position specifying process.

FIG. 15 is a flowchart showing an example of the bar line position specifying process. When the beat analysis process described with reference to the flowcharts of FIGS. 9 to 14 is executed, the tempo, the number of beats per bar, and bar time (measure length) for the entire music are extracted. Now, assume that the bar time determined by the beat analysis process is represented by measLen (in the unit of seconds), and the beat per bar is set to, for example, 4 beats per bar. In addition, assume that the position of a measure in the song as counted from the beginning (the number of the measure) is represented by measNum, and the provisionally determined head position (elapsed time, in the unit of seconds), from the beginning of the song, of the measure is represented by measTime [measNum]. Then, using measLen and measNum, measTime [measNum] is determined by the operation represented by the following equation (15).

$$measTime[measNum] = measLen \times measNum \quad (15)$$

The provisional head position measTime [measNum] of the measure determined by the above equation (15) is only a provisional value. If the correct start position of the measure is referred to as the "bar line position," the bar line position deviates from the provisional position measTime [measNum] due to the positional changes in each beat caused by the tempo fluctuation that occurs over time. If this deviation amount of the bar line is referred to as bestPhase, the correct bar line position is determined by the calculation represented by the following equation (16).

$$\text{bar line position} = measTime[measNum] + bestPhase \quad (16)$$

The bar line position specifying process shown in the flowchart of FIG. 15 is a process for calculating the bar line deviation amount bestPhase of the above equation (16) and specifying the correct bar line position.

In order to specify the bar line position, in the flowchart shown in FIG. 15, the CPU 101 first initially sets the bar line deviation amount assumed value measPhase (in the unit of seconds) to 0.0 (zero) in step S1501. After that, the CPU 101 repeats a series of processes from steps S1502 to S1509 while incrementing measPhase by, for example, 0.005 seconds (5 milliseconds) in step S1510, until it is determined in step S1502 that the predetermined maximum value is reached and the process is completed.

In the above iterative process, the CPU 101 further sets the bar number measNum and the error total value doVal to the initial value 0 (zero) in step S1503. After that, the CPU 101 executes each of the processes of steps S1505 and S1506 described below while sequentially incrementing the measure number measNum in step S1507, until it is determined that the last measure of the music has been reached in step S1504.

Here, the currently evaluated bar line position (current bar line position) (in the unit of seconds) corresponding to the current bar number measNum and the assumed bar line deviation amount measPhase is determined by the calculation represented by the following equation (17) like the above equation (16).

$$\text{current bar line position} = measTime[measNum] + measPhase \tag{17}$$

Here, when the bar corresponding to the current bar number measNum is divided into 16th note unit positions, the first one of the 16th note unit positions is equal to the current bar line position calculated by the above equation (17). If the current bar line position is represented by the digital sampling number as idx [0], this idx [0] is calculated by the calculation shown by the following equation (18) using the above equation (17).

$$idx[0]=(\text{measTime[measNum]+measPhase})\times\text{Sampling frequency [Hz]} \tag{18}$$

Further, if the sampling length of the 16th note in the bar is idx16, this idx16 is determined by the operation represented by the following equation (19) using the bar time measLen described above.

$$idx16 = measLen/16\times\text{sampling frequency [Hz]} \tag{19}$$

From the above equations (18) and (19), each sampling position idx [i] (1≤i≤15) other than idx [0], which divides the measure/bar corresponding to the current bar number measNum into respective positions in the 16th note unit, is determined by the operation represented by the following equation (20).

$$idx[i] = idx[i-1] + idx16\times i \tag{20}$$

Further, the frame position idx_f [i] (0≤i≤15), which converts the sampling position idx [i] (0≤i≤15) dividing the measure corresponding to the current bar number measNum into respective positions in the 16th note unit into a position in frame number, is determined by the calculation represented by the following equation (21). Here, fsize is a frame size (unit is "sample").

$$\text{idx\_f}[i] = idx[i]/fsize \tag{21}$$

Using idx_f [i] (0≤i≤15) calculated by the arithmetic processing represented by the above equations (18) to (21), the arithmetic processes of the following equations (22) to (25) are performed. In these arithmetic processes, beat level arrays in the unit of 16th notes for the bar with the assumed bar line deviation amount measPhase are calculated based on beat levels BL1, BL2, BL3, and BL4 extracted at each of the frame positions that divide the measure corresponding the current bar number measNum into 16th note unit positions. Here, BL1, BL2, BL3, and BL4 are beat levels extracted in the respective frequency bands of the entire band, the BD band, the SD band, and the chord band, respectively, by the processes shown in the flowchart of FIG. 8 described above.

$$\{BL1[\text{idx\_f}[0]], BL1[\text{idx\_f}[1]], BL1[\text{idx\_f}[2]], \ldots , BL1[\text{idx\_f}[15]]\} \tag{22}$$

$$\{BL2[\text{idx\_f}[0]], BL2[\text{idx\_f}[1]], BL2[\text{idx\_f}[2]], \ldots , BL2[\text{idx\_f}[15]]\} \tag{23}$$

$$\{BL3[\text{idx\_f}[0]], BL3[\text{idx\_f}[1]], BL3[\text{idx\_f}[2]], \ldots , BL3[\text{idx\_f}[15]]\} \tag{24}$$

$$\{BL4[\text{idx\_f}[0]], BL4[\text{idx\_f}[1]], BL4[\text{idx\_f}[2]], \ldots , BL4[\text{idx\_f}[15]]\} \tag{25}$$

On the other hand, for each of the frequency bands (entire band, BD band, SD band, and chord band, a beat pattern representing beat levels within one measure in the unit of 16th notes, i.e., 16 notes of 16th notes, which is exemplified in the following expression (26), is prepared.

$$\{1, 0.1, 0.3, 0.1, 0.5, 0.1, 0.3, 0.1, 0.7, 0.1, 0.3, 0.1, 0.3, 0.1, 0.3, 0.1\} \tag{26}$$

In the above expression (26), the four numbers in each row show the beat strengths of the sixteenth notes x four notes that make up one beat in the case of four quarter notes per bar (four-four time). The strength of these beats is normalized so that the maximum value is 1.

For example, the four numbers in the first line of expression (26) correspond to the first quarter note beat in the measure. In the first quarter note beat, the first digit "1" indicates that the maximum beat is produced at the first (head) of the first 16th note within the first beat. The following three numbers "0.1", "0.3", and "0.1" indicates beats with very small amplitudes at the second, third, and the fourth 16th notes in the first quarter note beat.

Also, the four numbers in the third line of expression (26) correspond to the third quarter note beat in the measure. At the third quarter note beat, the first number "0.7" indicates that a beat with a large amplitude is produced at the first (head) of the sixteenth note in the third beat. This value is the next largest amplitude after the largest value in the first quarter note beat. That is, in this example, it can be seen that the first quarter note beat and the third quarter note beat correspond to so-called strong beats.

On the other hand, the first values of the 16th notes on the second line and the fourth line of the expression (26) respectively corresponding to the second quarter note beat and the fourth quarter note beat in the bar are "0.5" and "0.3", respectively, which have relatively small amplitudes. Thus, in this example, it can be seen that the second and fourth quarter beats correspond to so-called weak beats.

In the present embodiment, a beat pattern as exemplified in the above expression (26) is prepared for each of the four frequency bands (entire bands, BD band, SD band, and chord band), and as a result, a total of four patterns are prepared.

Then, in step S1505, for the current measure corresponding to the current measure number measNum, the squares error is calculated for each of the beat level arrays in the unite of 16th notes, which are calculated by the above-mentioned equations (22) to (25) for the respective frequency bands (entire band, BD bands SD band, and chord band) with respect to the corresponding four beat patterns prepared in expression (26). Specifically, the squares error for each frequency band is calculated by taking a difference in value between 16 of the beat level sequence calculated by the corresponding one of the equations (22) to (25) and the beat pattern prepared for the frequency band, squaring them and adding them up.

Further, in step S1505, the squares error calculated as described above for each frequency band is accumulated for the four frequency bands, and the accumulation result is stored in the variable doV.

After that, in step S1506, the squares error doV calculated for the measure indicated by the current measure number measNum in step S1505 is accumulated in the variable do Val representing the squares error accumulation value of the entire music.

By executing each of the above processes of steps S1505 and S1506 over all the measures/bars of the music, the last measure of the music is reached in step S1504. Thereafter, in step S1508, it is determined whether or not the squares error cumulative value do Val of the entire music corresponding to the currently assumed bar line deviation amount of measPhase is smaller than the error minimum value "min" (which is initially set to a large value in step S1501) obtained so far.

If the determination in step S1508 is YES, the squares error cumulative value do Val of the entire music corresponding to the currently assumed bar line deviation amount, which has been calculated this time by the series of processes from steps S1504 to S1507, becomes the new minimum error "min." At the same time, the current assumed value of bar line deviation amount measPhase is set to the new optimum value for the bar line deviation amount bestPhase.

The above control processes are repeatedly executed while the assumed value of bar line deviation amount is successively updated, and when the determination in step S1502 becomes YES, the best value for the bar line deviation amount bestPhase is determined. Then, using this optimum value of the bar line deviation amount bestPhase, the measure line position corresponding to each measure number measNum is determined by the above-mentioned equation (16).

In the above description with respect to FIG. 15, the beat level sequence in units of 16th notes in the measure calculated by the operations represented by the above-mentioned equations (22) to (25) was used. But by using a beat level sequence in units of sixteenth notes obtained by accumulating beat level values for each of the divided subranges, which are obtained by dividing one bar by 16th note unit, a more stable bar line position specifying process can be executed.

In the embodiment described above, in the weighted average processing of step S1106 of FIG. 11, the combination of the weighting coefficients A, B, C, and D may be changed so as to determine the optimum combination of the weighting coefficients that achieve the highest correlation.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A method to be executed by at least one processor for determining a number of beats per bar from a music data provided to the at least one processor, the method comprising via the at least one processor:

receiving the music data;

deriving a first beat level waveform in accordance with a first power level waveform in a first frequency band from the music data and deriving a second beat level waveform in accordance with a second power level waveform in a second frequency band from the music data;

calculating a weighted average beat level waveform from the first beat level waveform and the second beat level waveform;

calculating autocorrelation on the weighted average beat level waveform by varying an amount of a shift interval for the autocorrelation;

determining a plurality of the shift intervals at which correlation values of the autocorrelation are n highest, where n is a positive integer greater than or equal to 2; and determining the number of beats per bar based on the determined plurality of the shift intervals at which the correlation values of the autocorrelation are n highest.

2. The method according to claim 1, wherein the autocorrelation for each of the shift intervals is calculated by calculating the correlation value between a segment of the weighted average beat level waveform having a prescribed time length, and another segment of the weighted average beat level waveform having the prescribed time length that has been shifted in time by the shift interval.

3. The method according to claim 1, wherein the deriving of the first and second beat level waveforms in accordance with the first and second power level waveforms, respectively, includes:

determining, from a power level waveform, which is the first or second power level waveform, a difference in power at a point at which a change rate of power transits from negative to positive and at a nearest next point at which the change rate of power transits from positive to negative; and creating a beat peak having the determined difference in power as a height thereof at a position of the nearest next point at which the change rate of power transits from positive to negative.

4. The method according to claim 1, wherein the determining of the plurality of the shift intervals at which the correlation values of the autocorrelation are n highest includes:

creating a histogram of the correlation values of the autocorrelation with respect to the shift intervals based on the weighted average beat level waveform.

5. The method according to claim 4, wherein the determining of the number of beats per bar based on the determined plurality of the shift intervals includes:

examining whether peak positions of the histogram that have n highest values are related to each other to satisfy a fractional multiplication relationship that would be satisfied in case of any of 3-beat per bar, 4-beat per bar, and 5-beat per bar; and determining the number of beats per bar based on the examination result.

6. The method according to claim 1, wherein the first frequency band is an entire frequency band of the music data, and wherein the second frequency band is one of a bass drum band, a snare drum band, and a chord band.

7. A device for determining a number of beats per bar from a music data, comprising at least one processor, configured to perform the following:

receiving the music data;

deriving a first beat level waveform in accordance with a first power level waveform in a first frequency band from the music data and deriving a second beat level waveform in accordance with a second power level waveform in a second frequency band from the music data;

calculating a weighted average beat level waveform from the first beat level waveform and the second beat level waveform;

calculating autocorrelation on the weighted average beat level waveform by varying an amount of a shift interval for the autocorrelation;

determining a plurality of the shift intervals at which correlation values of the autocorrelation are n highest, where n is a positive integer greater than or equal to 2; and determining the number of beats per bar based on the determined plurality of the shift intervals at which the correlation values of the autocorrelation are n highest.

8. The device according to claim 7, wherein the autocorrelation for each of the shift intervals is calculated by calculating the correlation value between a segment of the weighted average beat level waveform having a prescribed time length, and another segment of the weighted average beat level waveform having the prescribed time length that has been shifted in time by the shift interval.

9. The device according to claim 7, wherein the deriving of the first and second beat level waveforms in accordance with the first and second power level waveforms, respectively, includes:

determining, from a power level waveform, which is the first or second power level waveform, a difference in power at a point at which a change rate of power transits from negative to positive and at a nearest next point at which the change rate of power transits from positive to negative; and creating a beat peak having the determined difference in power as a height thereof at a position of the nearest next point at which the change rate of power transits from positive to negative.

10. The device according to claim 7, wherein the determining of the plurality of the shift intervals at which the correlation values of the autocorrelation are n highest includes:

creating a histogram of the correlation values of the autocorrelation with respect to the shift intervals based on the weighted average beat level waveform.

11. The device according to claim 10, wherein the determining of the number of beats per bar based on the determined plurality of the shift intervals includes:

examining whether peak positions of the histogram that have n highest values are related to each other to satisfy a magnification factor relationship that would be satisfied in case of any of 3-beat per bar, 4-beat per bar, and 5-beat per bar; and determining the number of beats per bar based on the examination result.

12. The device according to claim 7, wherein the first frequency band is an entire frequency band of the music data, and wherein the second frequency band is one of a bass drum band, a snare drum band, and a chord band.

13. A non-transitory computer readable storage medium storing a program executable by a computer, the program causing the computer to perform the following:

receiving the music data;

deriving a first beat level waveform in accordance with a first power level waveform in a first frequency band from the music data and deriving a second beat level waveform in accordance with a second power level waveform in a second frequency band from the music data;

calculating a weighted average beat level waveform from the first beat level waveform and the second beat level waveform;

calculating autocorrelation on the weighted average beat level waveform by varying an amount of a shift interval for the autocorrelation;

determining a plurality of the shift intervals at which correlation values of the autocorrelation are n highest, where n is a positive integer greater than or equal to 2; and determining the number of beats per bar based on the determined plurality of the shift intervals at which the correlation values of the autocorrelation are n highest.

* * * * *